(12) United States Patent
Tonosaki

(10) Patent No.: US 11,217,789 B2
(45) Date of Patent: Jan. 4, 2022

(54) COMPOSITE METAL OXIDE, POSITIVE ELECTRODE ACTIVE MATERIAL, POSITIVE ELECTRODE, SODIUM SECONDARY BATTERY, AND METHOD FOR PRODUCING COMPOSITE METAL OXIDE

(71) Applicant: SUMITOMO CHEMICAL COMPANY, LIMITED, Tokyo (JP)

(72) Inventor: Kiwamu Tonosaki, Tsukuba (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 39 days.

(21) Appl. No.: 16/497,538

(22) PCT Filed: Mar. 28, 2018

(86) PCT No.: PCT/JP2018/012937
§ 371 (c)(1),
(2) Date: Sep. 25, 2019

(87) PCT Pub. No.: WO2018/181555
PCT Pub. Date: Oct. 4, 2018

(65) Prior Publication Data
US 2020/0112023 A1 Apr. 9, 2020

(30) Foreign Application Priority Data
Mar. 29, 2017 (JP) .............................. JP2017-065248

(51) Int. Cl.
*H01M 4/505* (2010.01)
*C01G 53/00* (2006.01)
(Continued)

(52) U.S. Cl.
CPC ............ *H01M 4/505* (2013.01); *C01G 53/50* (2013.01); *C01G 53/66* (2013.01); *H01M 4/525* (2013.01);
(Continued)

(58) Field of Classification Search
CPC .... H01M 4/505; H01M 4/525; H01M 10/054; H01M 2004/028; C01G 53/50;
(Continued)

(56) References Cited

U.S. PATENT DOCUMENTS 7,794,879 B2 * 9/2010 Yamaki .................. H01M 4/52
429/221
2010/0323232 A1 * 12/2010 Kuze ..................... H01M 4/525
429/144
(Continued)

FOREIGN PATENT DOCUMENTS

JP 2009-209038 A 9/2009
JP 2010-235434 A 10/2010
(Continued)

OTHER PUBLICATIONS

International Search Report issued in corresponding International Patent Application No. PCT/JP2018/012937, dated Jun. 26, 2018, with English translation.
(Continued)

*Primary Examiner* — Andrew J. Oyer
(74) *Attorney, Agent, or Firm* — McDermott Will & Emery LLP

(57) ABSTRACT

Provided is a composite metal oxide which is represented by Formula (1) and has an α-NaFeO$_2$ type crystal structure, in which a peak half value width of a (104) plane to be measured by powder X-ray diffraction is 0.250° or less at 2θ.

$$Na_xM^1_r(Fe_yNi_zMn_wM_{1-y-z-w})O_{2\pm\delta} \quad (1)$$

(in Formula (1), M represents any one or more elements selected from the group consisting of B, Si, V, Ti, Co, Mo, Pd, Re, Pb, and Bi, M$^1$ represents any one or more elements selected from the group consisting of Mg and Ca, and relations $0 \le r \le 0.1$, $0.5 \le x \le 1.0$, $0.1 \le y \le 0.5$, $0 < z < 0.4$, $0 < w < 0.4$, $0 \le \delta \le 0.05$, and $y+z+w \le 1$ are satisfied).

10 Claims, 7 Drawing Sheets

(51) Int. Cl.
    *H01M 4/525*     (2010.01)
    *H01M 10/054*     (2010.01)
    *H01M 4/02*     (2006.01)

(52) U.S. Cl.
    CPC ....... *H01M 10/054* (2013.01); *C01P 2002/72* (2013.01); *C01P 2002/90* (2013.01); *C01P 2006/40* (2013.01); *H01M 2004/028* (2013.01)

(58) Field of Classification Search
    CPC . C01G 53/66; C01G 49/0027; C01P 2002/72; C01P 2002/90; C01P 2006/40
    See application file for complete search history.

(56) References Cited

U.S. PATENT DOCUMENTS

| | | | |
|---|---|---|---|
| 2012/0015230 A1 | 1/2012 | Kuze et al. | |
| 2016/0056461 A1* | 2/2016 | Komaba | H01M 10/054 429/144 |

FOREIGN PATENT DOCUMENTS

| | | |
|---|---|---|
| JP | 2011-236117 A | 11/2011 |
| JP | 2014-010973 A | 1/2014 |
| JP | 2014-160653 A | 9/2014 |
| JP | 2014-238960 A | 12/2014 |
| JP | 2015-176678 A | 10/2015 |
| WO | 2011/129419 A1 | 10/2011 |
| WO | 2014/156765 A1 | 10/2014 |

OTHER PUBLICATIONS

European Search Report issued in corresponding European Patent Application No. 18//5232.4-1106, dated Dec. 11, 2020.

Chinese Office Action issued in corresponding Chinese Patent Application No. 201880020985.0, dated Jun. 18, 2021, with English translation.

* cited by examiner

COMPOSITE METAL OXIDE, POSITIVE ELECTRODE ACTIVE MATERIAL, POSITIVE ELECTRODE, SODIUM SECONDARY BATTERY, AND METHOD FOR PRODUCING COMPOSITE METAL OXIDE

CROSS REFERENCE

This application is the U.S. National Phase under 35 U.S.C. § 371 of International Application No. PCT/JP2018/012937, filed on Mar. 28, 2018, which claims the benefit of Japanese Application No. 2017-065248, filed on Mar. 29, 2017, the entire contents of each are hereby incorporated by reference.

TECHNICAL FIELD

The present invention relates to a composite metal oxide, a positive electrode active material, a positive electrode, a sodium secondary battery, and a method for producing a composite metal oxide.

Priority is claimed on Japanese Patent Application No. 2017-065248, filed on Mar. 29, 2017, the content of which is incorporated herein by reference.

BACKGROUND ART

In recent years, lithium secondary batteries have been put into practical use as secondary batteries and the applications thereof have been expanding. However, lithium resources used in lithium secondary batteries cannot be said to be abundant. There is concern of depletion of lithium resources in the future.

On the other hand, resources of sodium, which is also an alkali metal, are abundant compared to lithium and are less expensive than lithium by one digit. Further, it is considered that since sodium has a relatively high standard potential, sodium secondary batteries may become high-capacity secondary batteries.

In a case where sodium secondary batteries can be used in place of current lithium secondary batteries, for example, mass production of large-sized secondary batteries such as automotive secondary batteries or distributed power storage secondary batteries can be made without concern of depletion of resources.

For example, Patent Document 1 suggests a composite metal oxide which can provide a sodium secondary battery having a high energy density. An active material described in Patent Document 1 is formed of a composite metal oxide containing sodium, manganese, and copper. Patent Document 1 describes that generation of a crystal phase such as a copper oxide is suppressed by setting the content of copper in the composite metal oxide to a specific amount or less.

CITATION LIST

Patent Literature

[Patent Document 1] Japanese Unexamined Patent Application, First Publication No. 2014-10973

DISCLOSURE OF INVENTION

Technical Problem

However, the water resistance of the sodium-containing composite metal oxide described in Patent Document 1 is insufficient. In other words, the sodium-containing composite metal oxide may deteriorate after reacting with the moisture in air or a slight amount of moisture contained in a solvent used for forming an electrode and releasing sodium in the sodium-containing composite metal oxide. As a result, the discharge capacity of a sodium secondary battery obtained by using the sodium-containing composite metal oxide described in Patent Document 1 as a positive electrode active material is degraded in some cases.

Further, the sodium in the sodium-containing composite metal oxide described in Patent Document 1 is released as sodium hydroxide in the case of reacting with moisture. Therefore, in a case where an electrode mixture paste containing a sodium-containing compound as an electrode active material is prepared, the material constituting the mixture paste reacts with sodium hydroxide and this results in gelation of the electrode mixture paste. Therefore, the application of the electrode mixture paste may become difficult in some cases. The present invention has been made in consideration of the above-described circumstances, and an object thereof is to provide a composite metal oxide suitable for use in a positive electrode active material for a sodium secondary battery with sufficient water resistance, a method for producing the same, an electrode for a sodium secondary battery, and a sodium secondary battery.

Solution to Problem

The present invention includes the following aspects [1] to [10].

[1] A composite metal oxide which is represented by Formula (1) and has an α-NaFeO$_2$ type crystal structure, in which a peak half value width of a (104) plane to be measured by powder X-ray diffraction is 0.250° or less at 2θ.

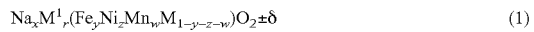

(in Formula (1), M represents any one or more elements selected from the group consisting of B, Si, V, Ti, Co, Mo, Pd, Re, Pb, and Bi, M$^1$ represents any one or more elements selected from the group consisting of Mg and Ca, and relations 0≤r≤0.1, 0.5≤x≤1.0, 0.1≤y≤0.5, 0<z<0.4, 0<w<0.4, 0≤δ≤0.05, and y+z+w≤1 are satisfied)

[2] The composite metal oxide according to [1], in which the peak half value width of the (104) plane to be measured by powder X-ray diffraction is less than 0.200° at 2θ.

[3] The composite metal oxide according to [1] or [2], in which y is greater than or equal to 0.2 and less than or equal to 0.5, z is greater than 0.15 and less than 0.4, and w is greater than 0.15 and less than 0.4.

[4] A positive electrode active material including: the composite metal oxide according to any one of [1] to [3].

[5] A positive electrode including: the positive electrode active material according to [4].

[6] A sodium secondary battery including: the positive electrode according to [5].

[7] A method for producing a composite metal oxide which has an α-NaFeO$_2$ type crystal structure and in which a peak half value width of a (104) plane to be measured by powder X-ray diffraction is 0.250° or less at 2θ, the method including: a mixing step of mixing a Na-containing compound, an Fe-containing compound, a Ni-containing compound, a Mn-containing compound, and an M-containing compound having a melting point of 800° C. or lower (M represents any one or more elements selected from the group consisting of B, Si, V, Ti, Co, Mo, Pd, Re, Pb, and Bi) to obtain a mixture; and a calcination step of calcining a powder which contains the mixture, in which the calcination step includes a first calcination step and a second calcination step, and the second calcination step is performed at a temperature higher than a temperature of the first calcination step.

[8] The method for producing a composite metal oxide according to [7], in which the first calcination step is performed at a holding temperature higher than or equal to 500° C. and lower than or equal to 900° C., the second calcination step is performed at a holding temperature higher than or equal to 750° C. and lower than or equal to 1000° C., and the second calcination step is performed at a holding temperature higher than the holding temperature of the first calcination step.

[9] The method for producing a composite metal oxide according to [7] or [8], in which the M-containing compound contains a compound having a melting point lower than or equal to the holding temperature of the first calcination step.

[10] The method for producing a composite metal oxide according to any one of [7] to [9], in which the M-containing compound contains B.

Advantageous Effects of Invention

According to the present invention, it is possible to provide a positive electrode active material for a sodium secondary battery with high water resistance, a positive electrode for a sodium secondary battery, and a sodium secondary battery.

Since the positive electrode active material for a sodium secondary battery according to the present invention is unlikely to react with the moisture in air due to its high water resistance, degradation of the discharge capacity caused by the elution of sodium can be suppressed. Further, since generation of sodium hydroxide which may react with the moisture in air and cause gelation can be suppressed, gelation is unlikely to occur, and the coatability of an electrode paste at the time of application can be improved.

BEST MODE CARRYING OUT THE INVENTION

<Composite Metal Oxide>

Figure 1A:
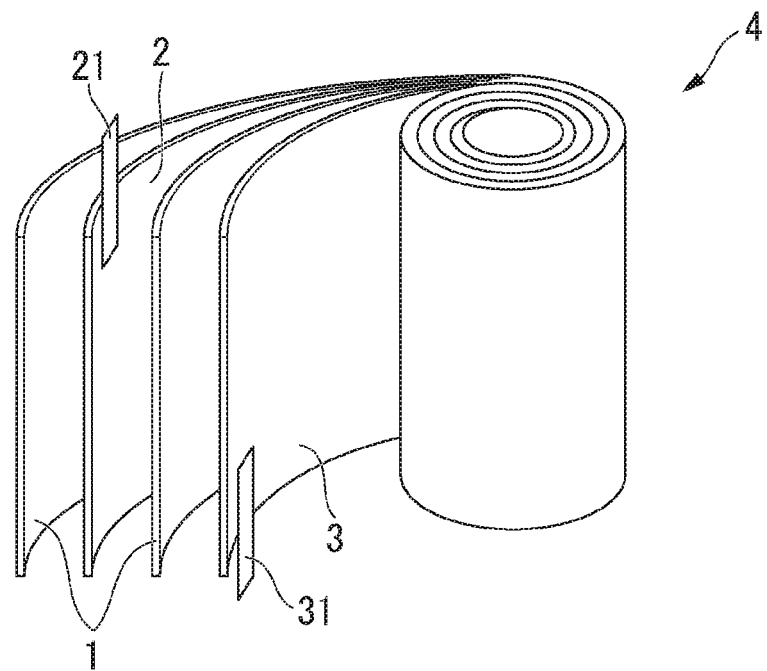
FIG. 1A is a schematic configuration view illustrating an example of a sodium secondary battery.

A composite metal oxide according to the present embodiment has an $\alpha$-NaFeO$_2$ type crystal structure and is represented by Formula (1), and the peak half value width of a (104) plane to be measured by powder X-ray diffraction is 0.250° or less at 2θ.

$$Na_xM^1{}_r(Fe_yNi_zMn_wM_{1-y-z-w})O_2 \pm \delta \quad (1)$$

(In Formula (1), M represents any one or more elements selected from the group consisting of B, Si, V, Ti, Co, Mo, Pd, Re, Pb, and Bi, M$^1$ represents any one or more elements selected from the group consisting of Mg and Ca, and relations 0≤r≤0.1, 0.5≤x≤1.0, 0.1≤y≤0.5, 0<z<0.4, 0<w<0.4, 0≤δ≤0.05, and y+z+w≤1 are satisfied.)

Peak Half Value Width of (104) Plane to be Measured by Powder X-Ray Diffraction

In the powder X-ray diffraction measurement performed on the composite metal oxide according to the present embodiment using CuKα rays, the peak half value width of the (104) plane is 0.250° or less, preferably 0.229° or less, and more preferably less than 0.200°.

In the present embodiment, the peak half value width of the (104) plane can be obtained by performing powder X-ray diffraction measurement, in which the measurement range of the diffraction angle 2θ is set to be greater than or equal to 100 and less than or equal to 90°, using CuKα as a radiation source, determining the peak of the (104) plane, and calculating the half value width thereof.

The composite metal oxide according to the present embodiment has a high crystallinity because the peak half value width of the (104) plane is less than or equal to the above-described upper limit. Therefore, the composite metal oxide according to the present embodiment is considered to have high water resistance due to the speculation that elution of sodium is unlikely to occur and sodium hydroxide is unlikely to form even with the coexistence of water.

In the present specification, the expression "the crystallinity is high" means that the amount of voids in crystals of the composite metal oxide is small and the content of crystals with less variation in interatomic distance is high.

In the present embodiment, the lower limit of the peak half value width of the (104) plane is not particularly limited and may be 0.100° or higher or 0.120° or higher as an example.

The upper limit and the lower limit of the half value width can be optionally combined.

According to another aspect of the present invention, the peak half value width of the (104) plane is preferably greater than or equal to 0.1000 and less than or equal to 0.2500, more preferably greater than or equal to 0.1000 and less than or equal to 0.2290, and still more preferably greater than or equal to 0.1200 and less than 0.200°.

Formula (1)

A composite metal oxide according to the present embodiment has an $\alpha$-NaFeO$_2$ type crystal structure and is represented by Formula (1).

$$Na_xM^1{}_r(Fe_yNi_zMn_wM_{1-y-z-w})O_2 \pm \delta \quad (1)$$

(In Formula (1), M represents any one or more elements selected from the group consisting of B, Si, V, Ti, Co, Mo, Pd, Re, Pb, and Bi, M$^1$ represents any one or more elements selected from the group consisting of Mg and Ca, and relations $0 \leq r \leq 0.1$, $0.5 \leq x \leq 1.0$, $0.1 \leq y \leq 0.5$, $0 < z < 0.4$, $0 < w < 0.4$, $0 \leq \delta \leq 0.05$, and $y+z+w \leq 1$ are satisfied.)

[x]

In a case where x in Formula (1) is 0.5 or greater, the capacity of the sodium secondary battery containing a positive electrode material to be obtained is large, and the energy density is increased. Further, in a case where x is greater than 1.0, impurities such as sodium carbonate are easily mixed into a positive electrode material to be obtained, the resistance of the sodium battery containing the positive electrode material is large, and the energy density is decreased. In other words, in a case where x is 1.0 or less, impurities such as sodium carbonate are unlikely to be mixed into a positive electrode material to be obtained, the resistance of the sodium battery containing the positive electrode material is small, and the energy density is increased.

[y]

In a case where y in Formula (1) is 0.1 or greater, a composite metal oxide having only an $\alpha$-NaFeO$_2$ type crystal structure tends to be obtained, and the energy density is increased. Further, in a case where y is 0.5 or less, the discharge capacity in the sodium secondary battery containing a positive electrode active material for a sodium secondary battery to be obtained is increased.

In order to increase the energy density of the composite metal oxide according to the present embodiment, y is preferably 0.15 or greater and more preferably 0.2 or greater.

Further, in order to increase the discharge capacity in the sodium secondary battery containing the positive electrode active material for a sodium secondary battery to be obtained, y is preferably 0.48 or less and more preferably 0.47 or less. The upper limit and the lower limit of y can be optionally combined.

In the present embodiment, y in Formula (1) is preferably greater than or equal to 0.2 and less than or equal to 0.5.

According to another aspect of the present invention, y is preferably greater than or equal to 0.1 and less than or equal to 0.5, more preferably greater than or equal to 0.15 and less than or equal to 0.48, and still more preferably greater than or equal to 0.2 and less than or equal to 0.47.

[z]

In a case where z in Formula (1) is greater than 0, the discharge capacity in the sodium secondary battery containing the positive electrode active material for a sodium secondary battery to be obtained is increased. Further, in a case where z is less than 0.4, a composite metal oxide having only an $\alpha$-NaFeO$_2$ type crystal structure tends to be obtained, and the energy density is increased.

In order to obtain a composite metal oxide having only an $\alpha$-NaFeO$_2$ type crystal structure and increase the energy density thereof in the positive electrode active material for a sodium secondary battery according to the present embodiment, z is preferably 0.3 or less. Further, in order to increase the discharge capacity in the sodium secondary battery containing a positive electrode active material for a sodium secondary battery to be obtained, z is preferably 0.2 or greater.

In the present embodiment, z is preferably greater than 0.15 and less than 0.4.

According to another aspect of the present invention, z is preferably greater than 0 and less than 0.4 and more preferably greater than or equal to 0.2 and less than or equal to 0.3.

[w]

In a case where w in Formula (1) is greater than 0, the capacity of the sodium secondary battery containing a positive electrode material to be obtained is large, and the energy density is increased. Further, in a case where w is less than 0.4, a composite metal oxide having only an $\alpha$-NaFeO$_2$ type crystal structure tends to be obtained.

In the present embodiment, w is preferably greater than 0.15 and less than 0.4.

In the present embodiment, y is preferably greater than or equal to 0.2 and less than or equal to 0.5, z is preferably greater than 0.15 and less than 0.4, and w is preferably greater than 0.15 and less than 0.4. Further, z is preferably w or less. The water resistance of the positive electrode material to be obtained is improved by setting z to be less than or equal to w.

[r]

In a case where r is 0 or greater, the energy density is increased. In a case where r is 0.1 or less, the discharge capacity is increased. In the present embodiment, r is preferably greater than or equal to 0 and less than or equal to 0.1 and more preferably greater than or equal to 0.01 and less than or equal to 0.05.

[$\delta$]

Further, $\delta$ is a value which is appropriately determined such that the composite metal oxide becomes neutral. In the present embodiment, $\delta$ is greater than or equal to 0 and less than or equal to 0.05.

The composite metal oxide according to the present embodiment has an $\alpha$-NaFeO$_2$ type crystal structure which is a layered rock salt type crystal structure. Therefore, sodium ions can be satisfactorily doped or dedoped at the time of driving the sodium secondary battery containing the composite metal oxide to be obtained.

The composite metal oxide according to the present embodiment has an impurity compound and an impurity phase such as nickel oxide in some cases, but may have an $\alpha$-NaFeO$_2$ type crystal structure in the crystal. Further, it is preferable for the composite metal oxide according to the present embodiment to be a single-phase composite metal oxide having only an $\alpha$-NaFeO$_2$ type crystal structure.

With the above-described configuration, the composite metal oxide according to the present embodiment has a high crystallinity. In this manner, the composite metal oxide is unlikely to react with the moisture in air and degradation of the discharge capacity caused by elution of sodium can be suppressed. Further, since generation of sodium hydroxide which may react with the moisture in air and cause gelation can be suppressed, gelation is unlikely to occur, and the coatability of an electrode paste at the time of application can be improved.

<Method for Producing Composite Metal Oxide>

In the present embodiment, first, a sodium (Na)-containing compound, an iron (Fe)-containing compound, a nickel (Ni)-containing compound, a manganese (Mn)-containing compound, and an M-containing compound having a melting point of 800° C. or lower (M represents any one or more elements selected from the group consisting of B, Si, V, Ti, Co, Mo, Pd, Re, Pb, and Bi) are mixed to obtain a mixture.

At this time, one or more compounds selected from the group consisting of an $M^1$-containing compound ($M^1$ represents any one or more elements selected from the group consisting of Mg and Ca) and an M-containing compound (M represents any one or more elements selected from the group consisting of B, Si, V, Ti, Co, Mo, Pd, Re, Pb, and Bi) having a melting point of higher than 800° C. may be optionally added to the mixture. As necessary, other compounds may be added to the mixture within the range where the effects of the present invention are not impaired.

Next, a composite metal oxide having an α-NaFeO$_2$ type crystal structure is produced by calcining the mixture.

Specifically, first, a metal element contained in a target composite metal oxide is prepared as a metal-containing compound containing the metal element.

Next, the metal-containing compound is weighed so as to have a composition corresponding to a desired metal element ratio, and a melting type reaction accelerator is added thereto and mixed to obtain a mixture. In addition, in a case where the M-containing compound is added as a melting type reaction accelerator as described below, the metal-containing compound is weighed so as to have a composition corresponding to a desired metal element ratio as a total amount of the metal-containing compound and the melting type reaction accelerator and then mixed to obtain a mixture.

Next, a composite metal oxide can be produced by calcining the obtained mixture.

For example, a composite metal oxide containing Na, Fe, Ni, Mn, and Ti at a metal element ratio of 1:0.4:0.3:0.15:0.15 can be exemplified as a preferred composite metal oxide.

Such a composite metal oxide can be produced by weighing respective raw materials of sodium carbonate (Na$_2$CO$_3$), iron(II, III) oxide (Fe$_3$O$_4$), nickel(II, III) oxide (Ni$_2$O$_3$), manganese(IV) oxide (MnO$_2$), and titanium(IV) oxide (TiO$_2$) such that the molar ratio of Na:Fe:Ni:Mn:Ti is set to 1:0.4:0.3:0.15:0.15, adding lead(II, III) oxide and dilead trioxide (Pb$_2$O$_3$) thereto as a melting type reaction accelerator, mixing the mixture, holding the obtained mixture at 650° C., and calcining the mixture under a condition of holding the mixture at 900° C.

The amount of the melting type reaction accelerator to be added is preferably in a range of 0.3% to 1.5% by mass and more preferably in a range of 0.5% to 1.0% by mass with respect to the total mass of the mixture.

Examples of the metal-containing compound include a compound which can be changed to an oxide at a high temperature by being combined with oxygen molecules in the atmosphere or oxygen atoms contained therein such as an oxide, a hydroxide, a carbonate, a nitrate, a halide, or an oxalate.

Na-Containing Compound

Examples of the Na-containing compound used as a raw material in the present embodiment include one or more compounds selected from the group consisting of sodium hydroxide (NaOH), sodium chloride (NaCl), sodium nitrate (NaNO$_3$), sodium peroxide (NaO$_2$), sodium sulfate (Na$_2$SO$_4$), sodium bicarbonate (NaHCO$_3$), sodium oxalate (Na$_2$C$_2$O$_4$), and sodium carbonate (Na$_2$CO$_3$). These compounds may be hydrates.

Among these, Na$_2$CO$_3$ is preferable from the viewpoints of low hygroscopicity and excellent handleability. Further, NaOH is preferable from the viewpoint that the reactivity at a low temperature is high, NaOH can be calcined at a relatively low calcination temperature, and thus the production cost can be lowered.

Mn-Containing Compound

As the Mn-containing compound used as a raw material in the present embodiment, MnO$_2$ is preferable.

Fe-Containing Compound and Ni-Containing Compound

As the Fe-containing compound used as a raw material in the present embodiment, iron(III) oxide (Fe$_2$O$_3$) and triiron tetraoxide (Fe$_3$O$_4$) are preferable. As the Ni-containing compound, nickel(II) oxide (NiO) and dinickel trioxide (Ni$_2$O$_3$) are preferable. Further, as the metal-containing compound, a compound containing two or more metal elements contained in the composite metal oxide of a target positive electrode active material for a sodium secondary battery may be used.

M-Containing Compound Having Melting Point of 800° C. or Lower

The "M-containing compound" having a melting point of 800° C. or lower is a compound containing, as M, any one or more selected from the group consisting of boron (B), silicon (Si), vanadium (V), titanium (Ti), cobalt (Co), molybdenum (Mo), palladium (Pd), rhenium (Re), lead (Pb), and bismuth (Bi).

In the present embodiment, as the M-containing compound, a compound containing boron and having a melting point of 800° C. or lower is preferable, boron oxide (B$_2$O$_3$), vanadium(V) oxide (V$_2$O$_5$), molybdenum(VI) oxide (MoO$_3$), rhenium(VII) oxide (Re$_2$O$_7$), lead(IV) oxide (PbO$_2$), dilead trioxide (Pb$_2$O$_3$), or bismuth(III) sulfide (Bi$_2$S$_3$) or the like is preferable, and boron oxide (B$_2$O$_3$) is more preferable. Further, a compound (for example, boric acid or the like) which is converted to the M-containing compound having a melting point of 800° C. or lower in the calcination step described below may be used in place of the M-containing compound having a melting point of 800° C. or lower or together with the M-containing compound having a melting point of 800° C. or lower.

The amount of the compound to be added, which is converted to the M-containing compound having a melting point of 800° C. or lower, is preferably in a range of 0.2% to 3% by mass, more preferably in a range of 0.5% to 2% by mass, and still more preferably in a range of 0.5% to 1.5% by mass with respect to the total mass of the Na-containing compound, the Mn-containing compound, the Fe-containing compound, and the Ni-containing compound.

In the present embodiment, since the M-containing compound has a melting point of 800° C. or lower, the M-containing compound can function as a melting type reaction accelerator. By adding the M-containing compound as a melting type reaction accelerator, the peak half value width of the (104) plane to be measured by powder X-ray diffraction in the composite metal oxide to be obtained tends to be narrowed.

In the present embodiment, it is preferable for the M-containing compound to contain a compound whose melting point is lower than or equal to the holding temperature in the first calcination step described below.

M$^1$-Containing Compound

In the present embodiment, the M$^1$-containing compound is any one or more compounds selected from the group consisting of a magnesium-containing compound and a calcium-containing compound. As the Mg-containing compound, magnesium carbonate, magnesium hydroxide, or magnesium oxide is preferable. As the Ca-containing compound, calcium carbonate, calcium hydroxide, or calcium oxide is preferable.

M-Containing Compound Having Melting Point of Higher than 800° C.

The "M-containing compound" having a melting point of higher than 800° C. is a compound containing, as M, any one or more selected from the group consisting of boron (B), silicon (Si), vanadium (V), titanium (Ti), cobalt (Co), molybdenum (Mo), palladium (Pd), rhenium (Re), lead (Pb), and bismuth (Bi). For example, titanium oxide (TiO$_2$) is exemplified as the titanium compound, silicon oxide (SiO$_2$) is exemplified as the silicon compound, cobalt(III) oxide (Co$_2$O$_3$) or cobalt(II, III) oxide (Co$_3$O$_4$) is exemplified as the cobalt compound, palladium(II) oxide (PdO) is exemplified as the palladium compound, and bismuth(II, III) oxide ($Bi_2O_3$) is exemplified as the bismuth compound.

Further, as compounds other than the sodium-containing compound, the M-containing compound having a melting point of 800° C. or lower, and the $M^1$-containing compound among metal-containing compounds, compounds obtained according to the coprecipitation method can be used. In the description below, a metal-containing compound which is a metal-containing compound other than the sodium-containing compound and is obtained according to the coprecipitation method will be referred to as a "transition metal-containing compound" for convenience.

Specifically, first, a compound such as a chloride, a nitrate, an acetate, a formate, an oxalate, or a sulfate of Mn, Fe, and Ni and the M-containing compound having a melting point of higher than 800° C. as necessary are dissolved in water to obtain a mixed aqueous solution.

The concentration of all compounds is preferably greater than or equal to 0.1 mol/kg and less than or equal to 2 mol/kg and preferably greater than or equal to 0.4 mol/kg and less than or equal to 1.6 mol/kg with respect to the total mass of the mixed aqueous solution.

Next, a precipitate containing a target transition metal-containing compound can be obtained by bringing the aqueous solution into contact with a precipitating agent.

Among compounds used as raw materials of the transition metal-containing compound, a chloride or a sulfate is preferable. Further, in a case where compounds which do not easily dissolve in water such as an oxide, a hydroxide, and a metal material are used as the raw materials of the transition metal-containing compound, they may be dissolved in an acid such as hydrochloric acid, sulfuric acid, or nitric acid; or an aqueous solution of sulfuric acid or nitric acid to obtain an aqueous solution.

Examples of the precipitating agent used for preparation of the transition metal-containing compound include one or more compounds selected from the group consisting of lithium hydroxide (LiOH), sodium hydroxide (NaOH), potassium hydroxide (KOH), lithium carbonate ($Li_2CO_3$), sodium carbonate ($Na_2CO_3$), potassium carbonate ($K_2CO_3$), ammonium carbonate (($NH_4$)$_2CO_3$), and urea (($NH_2$)$_2CO$). Each of these precipitating agents may be a hydrate or a combination of a compound and a hydrate.

Further, it is preferable for each of these precipitating agents to be dissolved in water and used as an aqueous solution (hereinafter referred to as a "precipitating agent aqueous solution"). The concentration of the precipitating agent is greater than or equal to 0.5 mol/L and less than or equal to 10 mol/L and preferably greater than or equal to 1 mol/L and less than or equal to 8 mol/L with respect to the total volume of the precipitating agent aqueous solution. The precipitating agent is preferably KOH or NaOH, and the precipitating agent aqueous solution is preferably a KOH aqueous solution or a NaOH aqueous solution. Further, ammonia water can be exemplified as the precipitating agent aqueous solution. Ammonia water and the precipitating agent aqueous solution may be used in combination.

Examples of the method of bringing the mixed aqueous solution into contact with the precipitating agent include a method (1) of adding any one or both of the precipitating agent and the precipitating agent aqueous solution to the mixed aqueous solution, a method (2) of adding the mixed aqueous solution to the precipitating agent aqueous solution, and a method (3) of adding any one or both of the mixed aqueous solution, and the precipitating agent and the precipitating agent aqueous solution to water.

It is preferable for stirring to also be performed in a case where the methods (1) to (3) are carried out. Among the above-described methods, the method (2) of adding the mixed aqueous solution to the precipitating agent aqueous solution is preferable. According to this method, a high pH of the precipitating agent aqueous solution is easily maintained during the operation, and the particle diameter of the precipitate to be obtained is easily controlled. In the method (2), the pH of the precipitating agent aqueous solution tends to decrease as the mixed aqueous solution is added to the precipitating agent aqueous solution. In the present embodiment, it is preferable to add the mixed aqueous solution to the precipitating agent aqueous solution while the pH of the precipitating agent aqueous solution is adjusted to 9 or greater and preferably 10 or greater. The pH thereof can be adjusted by performing addition to the precipitating agent aqueous solution.

In the coprecipitation method using the methods (1) to (3), it is preferable for the operation to be carried out in a nitrogen atmosphere or an argon atmosphere in order to suppress generation of impurities.

According to the methods (1) to (3), the precipitate containing a transition metal-containing compound can be prepared.

A slurry containing a precipitate is obtained by mixing the mixed aqueous solution and the precipitating agent. A precipitate containing a transition metal-containing compound is obtained by performing solid-liquid separation on the slurry to be obtained and recovering the precipitate. The solid-liquid separation may be performed using any method.

It is preferable for the solid-liquid separation to be performed through filtration because that operation is easily carried out. Further, a method of volatilizing the liquid from the slurry such as heat drying, blast drying, vacuum drying, or spray drying may be used.

The recovered precipitate may be dried after being washed with a washing solution. An excess amount of the precipitating agent is attached to the precipitate obtained after the solid-liquid separation in some cases, but the attached precipitating agent can be reduced by washing the precipitate. As the washing solution used for washing the precipitate, water or a water-soluble organic solvent such as alcohol or acetone is preferable, and water is more preferable.

Examples of the method for drying the precipitate include heat drying, blast drying, vacuum drying, and a combination of these. The heat drying is performed preferably at a temperature higher than or equal to 50° C. and lower than or equal to 300° C. and more preferably at a temperature higher than or equal to 100° C. and lower than or equal to 200° C.

In a case where washing and drying of the precipitate using a washing solution are carried out in a combined manner and counted as once, the washing and drying may be carried out two or more times.

Examples of the mixing method in the mixing of the sodium-containing compound, the manganese-containing compound, the iron-containing compound, the nickel-containing compound, and the M-containing compound having a melting point of 800° C. or lower or the mixing of the sodium-containing compound, the transition metal-containing compound, and the M-containing compound having a melting point of 800° C. or lower include dry mixing and wet mixing. Among these, dry mixing is preferable because the operation is simple.

Examples of the mixing device include a stirring and mixing device, a V type mixer, a W type mixer, a ribbon mixer, a drum mixer, and a ball mill.

In addition, the same mixing method as described above can be performed at the time of mixing the $M^1$-containing compound.

The composite metal oxide can be obtained by calcining the mixture obtained using the above-described method.

The calcination step includes a first calcination step and a second calcination step, and the second calcination step is performed at a temperature higher than the temperature of the first calcination step. Specifically, in a case where the preset temperature of a calcination device in the first calcination step is compared to the preset temperature of a calcination device in the second calcination step, the preset temperature of the calcination device in the second calcination step is higher than the preset temperature of the calcination device in the first calcination step. By calcining the mixture in the calcination step including two steps carried out at different preset temperatures, the peak half value width of the (104) plane to be measured by powder X-ray diffraction in the composite metal oxide to be obtained is narrowed, and the water resistance tends to be improved. It is preferable for the first calcination step and the second calcination step to be carried out at a constant temperature maintained for a fixed time. The constant temperature in the present embodiment indicates that a specific preset temperature is maintained for a fixed time in the calcination device, and the actual temperature may change somewhat.

In the first calcination step, the lower limit of the holding temperature is preferably 500° C. or higher and more preferably 550° C. or higher. The upper limit thereof is preferably 900° C. or lower and more preferably 800° C. or lower.

The upper limit and the lower limit of the holding temperature in the first calcination step can be optionally combined.

According to another aspect of the present invention, the holding temperature in the first calcination step is preferably higher than or equal to 500° C. and lower than or equal to 900° C. and more preferably higher than or equal to 550° C. and lower than or equal to 800° C.

In the second calcination step, the lower limit of the holding temperature is preferably 750° C. or higher and more preferably 800° C. or higher. The upper limit thereof is preferably 1000° C. or lower and preferably 950° C. or lower.

The upper limit and the lower limit of the holding temperature in the second calcination step can be optionally combined.

According to another aspect of the present invention, the holding temperature in the second calcination step is preferably higher than or equal to 750° C. and lower than or equal to 1000° C. and more preferably higher than or equal to 800° C. and lower than or equal to 950° C.

The "holding temperature" in the present specification indicates the preset temperature of the calcination device.

The holding time in the first calcination step is preferably longer than or equal to 0.1 hours and shorter than or equal to 10 hours, more preferably longer than or equal to 1 hour and shorter than or equal to 8 hours, and particularly preferably longer than or equal to 2 hours and shorter than or equal to 6 hours.

The holding time in the second calcination step is preferably longer than or equal to 5 hours and shorter than or equal to 20 hours, more preferably longer than or equal to 7 hour and shorter than or equal to 18 hours, and particularly preferably longer than or equal to 8 hours and shorter than or equal to 15 hours.

The temperature increase rate from the start of temperature increase to the target holding temperature in the first calcination step, and the temperature increase rate from the end of the first calcination step to the target holding temperature in the second calcination step are preferably greater than or equal to 50° C./hour and less than or equal to 400° C./hour. Further, the temperature decrease rate from the end of the second calcination step to room temperature is preferably greater than or equal to 10° C./hour and less than or equal to 400° C./hour.

Examples of the atmosphere during calcination include an air atmosphere, an oxygen atmosphere, a nitrogen atmosphere, an argon atmosphere, and a mixed gas atmosphere of these. The air atmosphere is preferable because it can be easily controlled, and the oxygen atmosphere, the nitrogen atmosphere, the argon atmosphere, or the mixed gas atmosphere is preferable in view of stability of the sample after calcination.

Further, the crystallinity of the composite metal oxide to be generated can be increased by using a suitable amount of a halide such as a fluoride or a chloride as the metal-containing compound in addition to the melting type reaction accelerator.

Further, a product (composite metal oxide) to be obtained by the calcination may be ground, washed, or classified optionally using a device which has been typically used industrially such as a ball mill, a jet mill, or a vibration mill.

<Positive Electrode for Sodium Secondary Battery and Method for Producing Same>

The positive electrode for a sodium secondary battery according to the present embodiment contains the composite metal oxide according to the present embodiment as a positive electrode active material. The content of the positive electrode active material is preferably in a range of 80% to 97% by mass and more preferably in a range of 85% to 97% by mass with respect to the total mass of the positive electrode for a sodium secondary battery.

The positive electrode for a sodium secondary battery can be produced by allowing a positive electrode mixture containing a positive electrode active material, a conductive material, and a binder to be supported by a positive electrode current collector.

The content of the conductive material is preferably in a range of 0.1% to 12% by mass and more preferably in a range of 0.2% to 10% by mass with respect to the total mass of the positive electrode active material.

The content of the binder is preferably in a range of 0.5% to 12% by mass and more preferably in a range of 1% to 8% by mass with respect to the total mass of the positive electrode active material.

Examples of the conductive material include carbon materials such as natural graphite, artificial graphite, cokes, and carbon black.

A thermoplastic resin may be exemplified as the binder. Specific examples of the thermoplastic resin include a fluorine resin such as polyvinylidene fluoride (hereinafter, also referred to as PVDF), polytetrafluoroethylene (hereinafter, also referred to as PTFE), an ethylene tetrafluoride-propylene hexafluoride-vinylidene fluoride-based copolymer, a propylene hexafluoride-vinylidene-fluoride-based copolymer, or an ethylene tetrafluoride-perfluorovinyl ether-based copolymer; and a polyolefin resin such as polyethylene or polypropylene. As the resin, two or more of these may be used.

Examples of the positive electrode current collector include aluminum metals, nickel metals, and stainless steel. An aluminum metal is preferable because it can be easily processed into a thin film and has a low cost. Examples of the shape of the positive electrode current collector include a foil shape, a flat plate shape, a mesh shape, a net shape, a lath shape, and a punching shape, and a combination of these (for example, a mesh-like flat plate). The surface of the positive electrode current collector may be formed to be uneven through an etching treatment or embossing processing.

Examples of the method of allowing the positive electrode mixture to be supported by the positive electrode current collector include a method of fixing the positive electrode mixture to the current collector by performing pressure molding.

In addition, the method of fixing the positive electrode mixture to the positive electrode current collector can be employed by further adding an organic solvent to the positive electrode mixture to obtain a positive electrode mixture paste, coating the positive electrode current collector with this positive electrode mixture paste, and drying the current collector. According to this method, the positive electrode mixture may be firmly fixed to the positive electrode current collector by pressing a sheet obtained by fixing the positive electrode mixture to the positive electrode current collector.

Examples of the organic solvent used in the positive electrode mixture paste include an amine-based solvent such as N,N-dimethylaminopropylamine or diethylenetriamine; an ether-based solvent such as tetrahydrofuran; a ketone-based solvent such as methyl ethyl ketone; an ester-based solvent such as methyl acetate; and an amide-based solvent such as dimethylacetamide or N-methyl-2-pyrrolidone (hereinafter, also referred to as NMP).

The kneading method at the time of preparation of the positive electrode mixture paste is not particularly limited, and a mixer having a high shearing force is preferable as the mixer used for kneading. Specific examples thereof include a planetary mixer, a kneader, an extrusion type kneader, and a thin-film revolving high speed stirrer.

As the mixing order, the positive electrode active material, the conductive material, the binder, and the solvent may be mixed at once, or the binder, the positive electrode active material, and the conductive material may be sequentially mixed into the solvent. This order is not particularly limited, and the mixture of the positive electrode active material and the conductive material may be gradually added thereto. Further, the binder may be mixed with the solvent in advance to be dissolved therein.

Examples of the method of coating the positive electrode current collector with the positive electrode mixture paste include a slit die coating method, a screen coating method, a curtain coating method, a knife coating method, a gravure coating method, and an electrostatic spray method.

The positive electrode according to the present embodiment can be produced as described above.

Since the positive electrode for a sodium secondary battery with the above-described configuration has the above-described positive electrode active material for a sodium secondary battery according to the present embodiment, a sodium secondary battery with high energy density can be provided in a case where the positive electrode is used for preparation of a sodium secondary battery.

<Sodium Secondary Battery>

The sodium secondary battery according to the present embodiment includes the above-described positive electrode according to the present embodiment, a negative electrode, and a nonaqueous electrolyte.

(Negative Electrode)

The negative electrode can be doped with sodium ions or dedoped at a lower potential than the positive electrode. Examples of the negative electrode include an electrode in which a negative electrode mixture containing a negative electrode material is supported by a negative electrode current collector and an electrode formed of only a negative electrode material. Examples of the negative electrode material include materials which can be doped with sodium ions or dedoped at a lower potential than the positive electrode, among carbon materials, chalcogen compounds (such as oxides and sulfides), nitrides, metals, and alloys. These negative electrode materials may be mixed.

Specific examples of the negative electrode material are as follows. Specific examples of the carbon material include materials which can be doped with sodium ions or dedoped at a lower potential than the positive electrode, among graphite such as natural graphite or artificial graphite, cokes, carbon black, pyrolytic carbon, carbon fibers, and polymer calcined materials. These carbon materials, oxides, sulfides, and nitrides may be used in combination and may be crystalline or amorphous. These carbon materials, oxides, sulfides, and nitrides are used as negative electrodes by mainly being supported by a negative electrode current collector. Specific examples of the metals include sodium metals, silicon metals, and tin metals. Examples of the alloys include a sodium alloy such as a sodium-aluminum alloy, a sodium-nickel alloy, or a sodium-silicon alloy; a silicon alloy such as a silicon-zinc alloy; a tin alloy such as a tin-manganese alloy, a tin-cobalt alloy, a tin-nickel alloy, a tin-copper alloy, a tin-lanthanum alloy, or a tin-nickel-lanthanum alloy; and an alloy such as a copper-antimony alloy. These metals and alloys are mainly used alone as an electrode (for example, a foil-like electrode). Examples of the oxides include an oxide such as lithium titanium oxide ($Li_4Ti_5O_{12}$).

The negative electrode mixture may contain a binder as necessary. A thermoplastic resin may be exemplified as the binder. Specific examples of the thermoplastic resin include PVDF, thermoplastic polyimide, carboxymethyl cellulose, polyethylene, and polypropylene. In a case where an electrolytic solution does not contain ethylene carbonate described below and the negative electrode mixture contains polyethylene carbonate, cycle characteristics of a battery to be obtained and large current discharge characteristics are improved in some cases.

Examples of the negative electrode current collector include copper metals, nickel metals, stainless steel, and aluminum metals. Copper metals or aluminum metals are preferable because they do not easily form an alloy with sodium and are easily processed into a thin film. Examples of the method of allowing the negative electrode mixture to be supported by the negative electrode current collector include, similar to the positive electrode, a method of performing press molding; and a method of fixing the negative electrode mixture to the negative electrode current collector by further using an organic solvent or the like to obtain a negative electrode mixture paste, coating the negative electrode current collector with the paste, drying the current collector to obtain a sheet, and pressing the obtained sheet.

(Nonaqueous Electrolyte)

Examples of the nonaqueous electrolyte which can be used for the sodium secondary battery according to the present embodiment include sodium perchlorate ($NaClO_4$), sodium hexafluorophosphate ($NaPF_6$), sodium hexafluoroarsenate ($NaAsF_6$), sodium hexafluoroantimonate ($NaSbF_6$), sodium tetrafluoroborate ($NaBF_4$), sodium trifluoromethanesulfonate ($NaCF_3SO_3$), sodium bis(trifluoromethanesulfonyl)imide ($NaN(SO_2CF_3)_2$), a lower aliphatic carboxylic acid sodium salt, and sodium tetrachloroaluminate ($NaAlCl_4$). As the nonaqueous electrolyte, a mixture of two or more of these may be used. It is preferable for the electrolyte to contain at least one fluorine-containing sodium salt selected from the group consisting of $NaPF_6$, $NaAsF_6$, $NaSbF_6$, $NaBF_4$, $NaCF_3SO_3$, and $NaN(SO_2CF_3)_2$.

Further, the nonaqueous electrolyte can be used as a nonaqueous electrolytic solution after being dissolved in an organic solvent.

The content of the nonaqueous electrolyte is preferably in a range of 0.3 to 2.5 mol % and more preferably in a range of 0.5 to 2 mol % with respect to the total mass of the nonaqueous electrolytic solution.

Examples of the organic solvent in the nonaqueous electrolytic solution include carbonates such as propylene carbonate, ethylene carbonate, dimethyl carbonate, diethyl carbonate, ethyl methyl carbonate, isopropyl methyl carbonate, vinylene carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; a sulfur-containing compound such as sulfolane, dimethyl sulfoxide, or 1,3-propane sultone; and an organic solvent which contains a fluorine substituent, in which a fluorine substituent is further introduced into the organic solvent.

It is preferable for a part of the organic solvent in the nonaqueous electrolytic solution to contain an organic solvent containing a fluorine substituent.

Examples of the organic solvent containing a fluorine substituent include 4-fluoro-1,3-dioxolan-2-one (hereinafter, also referred to as FEC or fluoroethylene carbonate) and trans- or cis-4,5-difluoro-1,3-dioxolan-2-one (hereinafter, also referred to as DFEC or difluoroethylene carbonate).

As the organic solvent containing a fluorine substituent, 4-fluoro-1,3-dioxolan-2-one is preferable.

The organic solvent containing any of these fluorine substituents may be used alone, but it is preferable to use a mixed solvent obtained by combining an organic solvent that does not contain a fluorine substituent with this organic solvent. In a case where a part of the organic solvent in the nonaqueous electrolytic solution contains an organic solvent containing a fluorine substituent, the proportion of the organic solvent containing a fluorine substituent is greater than or equal to 0.01% by volume and less than or equal to 10% by volume, preferably greater than or equal to 0.1% by volume and less than or equal to 8% by volume, and more preferably greater than or equal to 0.5% by volume and less than or equal to 5% by volume with respect to the total volume of the nonaqueous electrolytic solution.

The nonaqueous electrolyte can be used in a state in which the nonaqueous electrolytic solution is held by a polymer compound, in other words, the nonaqueous electrolyte can be used as a gel-like electrolyte.

Further, a solid electrolyte can be used as the nonaqueous electrolyte which can be used in the sodium secondary battery according to the present embodiment.

As the solid electrolyte, for example, a polyethylene oxide-based polymer compound or a polymer electrolyte of a polymer compound containing at least one or more of a polyorganosiloxane chain and a polyoxyalkylene chain can be used. Further, safety can be further increased by using, as the solid electrolyte, a sulfide electrolyte such as sodium sulfide-silicon sulfide ($Na_2S$—$SiS_2$), sodium sulfide-germanium sulfide ($Na_2S$—$GeS_2$), sodium sulfide-phosphorus sulfide ($Na_2S$—$P_2S_5$), or sodium sulfide-boron sulfide ($Na_2S$—$B_2S_3$); an inorganic compound electrolyte containing a sulfide such as sodium sulfide-silicon sulfide-sodium phosphate ($Na_2S$—$SiS_2$—$Na_3PO_4$) or $Na_2S$—$SiS_2$—$Na_2SO_4$; or a NASICON type electrolyte such as sodium zirconium phosphate ($NaZr_2(PO_4)_3$).

Further, in a case where a solid electrolyte is used in the sodium secondary battery according to the present embodiment, the solid electrolyte plays a role of a separator described below in some cases. In this case, a separator may not be required.

(Separator) The sodium secondary battery according to the present embodiment may include a separator disposed between the positive electrode and the negative electrode. Examples of the form of the separator include a porous film, a nonwoven fabric, and a woven fabric.

Examples of the material that forms the separator include materials such as a polyolefin resin, for example, polyethylene or polypropylene, a fluorine resin, and a nitrogen-containing aromatic polymer. Further, a single-layer separator or laminated separator obtained by using two or more of these materials may be used.

As the separator, the separators described in Japanese Unexamined Patent Application, First Publication No. 2000-30686 and Japanese Unexamined Patent Application, First Publication No. H10-324758 can be exemplified.

From the viewpoints of increasing the volume energy density of the battery and reducing the internal resistance, it is preferable for the thickness of the separator to be as small as possible within the range where the mechanical strength is maintained. Typically, the thickness of the separator is preferably greater than or equal to 5 μm and less than or equal to 200 μm and more preferably greater than or equal to 5 μm and less than or equal to m.

It is preferable for the separator to have a porous film containing a thermoplastic resin. In a case where an abnormal current flows in the battery due to a short circuit or the like between the positive electrode and the negative electrode in the sodium secondary battery, it is preferable to cut off the current and to prevent (shut down) an excessive current from flowing.

In a case where the separator has a porous film containing a thermoplastic resin, the shutdown is performed by the porous film in the separator being softened or melted to block fine holes in a case where the separator in a short circuit point is overheated due to the short circuit and the temperature of the separator exceeds the pre-estimated (typical) working temperature. Further, even in a case where the temperature in the battery is increased to a high temperature of a certain level after the shutdown, it is preferable for the film of the separator not to be damaged due to the temperature and for the heat resistance thereof to be high enough to maintain the state after the shutdown.

The damage to the film due to heat can be prevented by using a separator formed of a laminated porous film in which a heat resistant porous layer containing a heat resistant resin and a porous film containing a thermoplastic resin are laminated, as the separator. Here, the heat resistant porous layer may be laminated on both surfaces of the porous film.

(Method for Producing Sodium Secondary Battery)

Figure 1B:
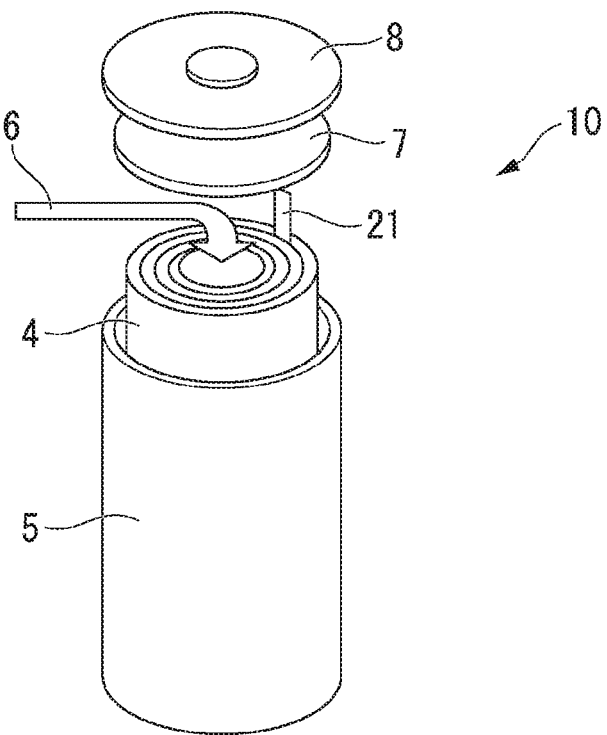
FIG. 1B is a schematic configuration view illustrating an example of a sodium secondary battery.

FIG. 1A and FIG. 1B are schematic views illustrating an example of the sodium secondary battery according to the present embodiment. A cylindrical sodium secondary battery 10 according to the present embodiment is produced in the following manner.

First, as illustrated in FIG. 1A, a pair of strip-like separators 1, a strip-like positive electrode 2 having a lead 21 at one end, and a strip-like negative electrode 3 having a lead 31 at one end are laminated and wound in order of the separator 1, the positive electrode 2, the separator 1, and the negative electrode 3 to obtain an electrode group 4.

Next, as illustrated in FIG. 1B, the electrode group 4 and an insulator (not illustrated) are stored in a battery can 5, the bottom of the can is sealed, the electrode group 4 is impregnated with an electrolytic solution 6, and an electrolyte is disposed between the positive electrode 2 and the negative electrode 3. Further, the sodium secondary battery 10 can be produced by sealing the upper portion of the battery can 5 with a top insulator 7 and a sealing member 8.

As the shape of the electrode group 4, a columnar shape in which the cross-sectional shape obtained by cutting the electrode group 4 in a direction perpendicular to a winding shaft is a circle, an ellipse, a rectangle, or a rectangle with rounded corners can be exemplified.

Further, as the shape of the sodium secondary battery having such an electrode group 4, a shape defined in IEC60086 which is a standard for batteries defined by International Electrotechnical Commission (IEC) or JIS C 8500 can be employed. Examples thereof include shapes such as a cylindrical shape and a square shape.

Further, the configuration of the sodium secondary battery is not limited to the above-described winding type configuration, and the sodium secondary battery may have a laminate type configuration formed by repeatedly stacking a structure in which the positive electrode, the separator, the negative electrode, and the separator are laminated. Examples of the laminate type sodium secondary battery include so-called coin type batteries, button type batteries, and paper type (or sheet type) batteries.

Since the sodium secondary battery having such a configuration includes the positive electrode for a sodium secondary battery according to the present embodiment, sodium is unlikely to elute during the production and the energy density increases.

Hereinbefore, preferred embodiments of the present invention have been described with reference to the accompanying drawings, but the present invention is not limited to the examples. The shapes, the combinations, and the like of each constituent member in the above-described examples are merely examples, and various changes can be made based on the design requirements within the range not departing from the scope of the present invention.

EXAMPLES

Hereinafter, the present invention will be described based on examples and comparative examples.

[Measurement and Evaluation Method]
(1) Powder X-Ray Diffraction Measurement
The powder X-ray diffraction measurement was performed under the following conditions using a powder X-ray diffraction measuring device X'pertPRO MPD (manufactured by PANalytical Inc.)
X-ray: CuKα
Voltage-current: 45 kV–40 mA
Measurement angle range: 2θ=10° to 90°
Step: 0.02°
Scan speed: 4°/min The powder X-ray diffraction spectrum was analyzed using powder X-ray diffraction pattern comprehensive analysis software JADE 5.0 (manufactured by Rigaku Corporation), and the peak half value width of the (104) plane was performed by executing the peak search command under conditions of a background determination range of 0.6 and a background averaging point number of 9.

(2) pH Measurement
The pH was acquired by adding 20 mL of pure water to 1 g of composite metal oxide powder, stirring the solution at room temperature for 5 minutes, and performing measurement on the solution that had stood for 30 seconds using a pH meter D-52 (manufactured by HORIBA, Ltd.).

(3) Evaluation of Coatability
The composite metal oxides of Examples 1 to 10 and Comparative Examples 1 and 2, acetylene black (HS100, manufactured by Denka Co., Ltd.) as a conductive material, PVDF (TA5130, manufactured by Solvay S. A.) as a binder, and NMP (Lithium Battery Grade, manufactured by Kishida Chemical Co., Ltd.) as an organic solvent were used. PVDF was weighed such that the weight ratio (PVDF:NMP) was set to 6:94, stirred, and dissolved to obtain a binder solution. The composite metal oxide, the conductive agent, the binder, and NMP were weighed such that the weight ratio (composite metal oxide:conductive agent:binder:NMP) was set to 90:5:5:100, and the solution was stirred and mixed with the binder solution using T. K. FILMIX Model 30-25 (manufactured by PRIMIX Corporation), thereby obtaining an electrode mixture paste. A rotation wheel was set to rotate under conditions of 7000 rpm for 3 minutes. In Table 1, a case where the electrode mixture paste was not able to be applied because the paste was gelled or cured was evaluated as "x" and a case where the paste was able to be applied without any problems was evaluated as "◯."

Example 1

An agate mortar was charged with 153.7 mg of boric acid ($H_3BO_3$), sodium carbonate ($Na_2CO_3$), manganese(IV) oxide ($MnO_2$), iron(III) oxide ($Fe_2O_3$), and nickel(II) oxide (NiO) were used as metal-containing compounds, 15 g of the compounds in total was weighed such that the molar ratio of Na:Mn:Fe:Ni was set to 0.99:0.35:0.30:0.35, and the agate mortar was charged with the compounds and dry-mixed to obtain a mixture.

Figure 2:
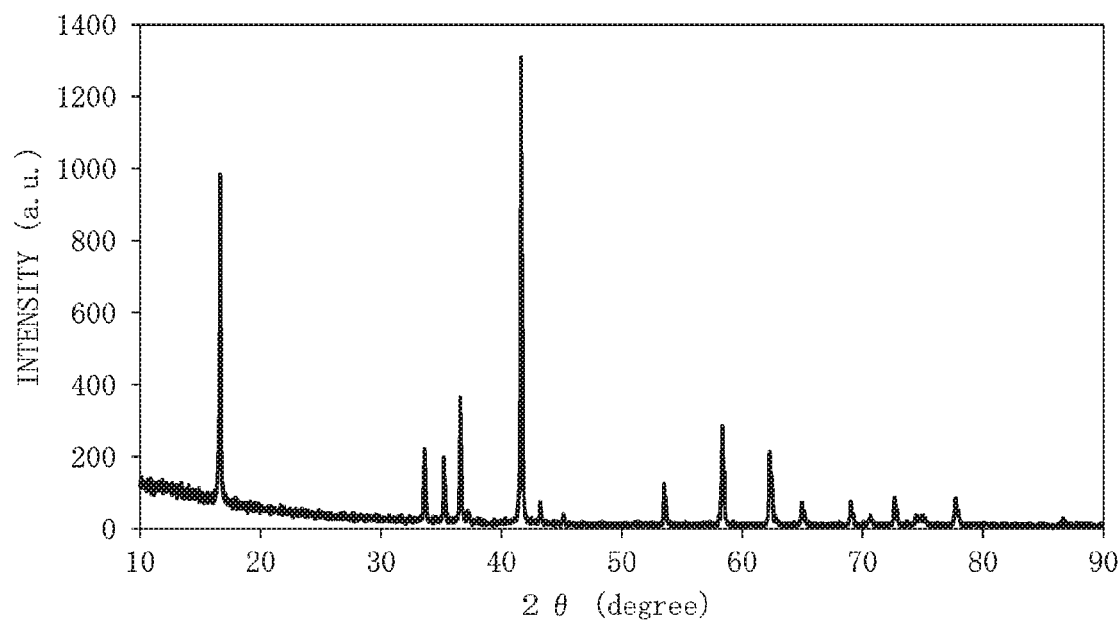
FIG. 2 is an XRD chart for a composite metal oxide of Example 1.

An alumina crucible was filled with the obtained mixture and heated in the air atmosphere using an electric furnace, the state was held at 650° C. for 4 hours in the first calcination step and then held at 900° C. for 12 hours in the second calcination step, and the mixture was calcined and cooled to room temperature, thereby obtaining a composite metal oxide 1 ($Na_{0.99}Mn_{0.35}Fe_{0.3}Ni_{0.35}O_2$). Powder X-ray diffraction measurement performed on the composite metal oxide 1 showed that the crystal structure of the composite metal oxide 1 belonged to an α-$NaFeO_2$ type crystal structure (FIG. 2). The peak half value width of the (104) plane of this α-$NaFeO_2$ type crystal structure was 0.160 at 2θ. pH measurement performed on the composite metal oxide 1 yielded a value of 12.5.

Example 2

An agate mortar was charged with 153.6 mg of boric acid ($H_3BO_3$), sodium carbonate ($Na_2CO_3$), manganese(IV) oxide ($MnO_2$), iron(III) oxide ($Fe_2O_3$), and nickel(II) oxide (NiO) were used as metal-containing compounds, 15 g of the compounds in total was weighed such that the molar ratio of Na:Mn:Fe:Ni was set to 0.99:0.30:0.40:0.30, and the agate mortar was charged with the compounds and dry-mixed to obtain a mixture.

Figure 3:
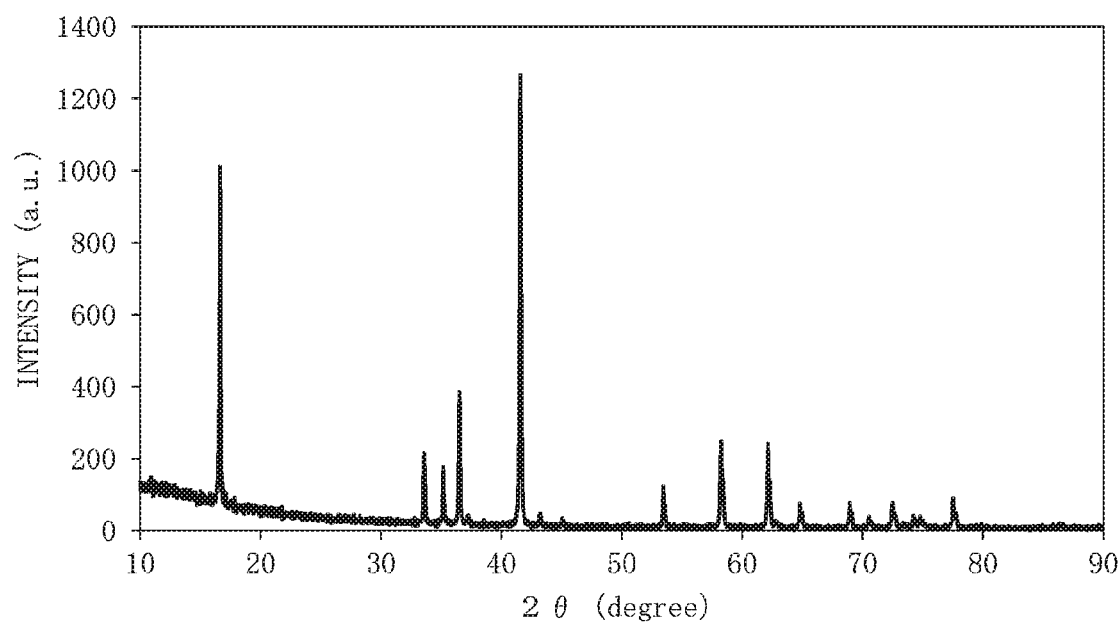
FIG. 3 is an XRD chart for a composite metal oxide of Example 2.

An alumina crucible was filled with the obtained mixture and heated in the air atmosphere using an electric furnace, the state was held at 650° C. for 4 hours in the first calcination step and then held at 900° C. for 12 hours in the second calcination step, and the mixture was calcined and cooled to room temperature, thereby obtaining a composite metal oxide 2 ($Na_{0.99}Mn_{0.30}Fe_{0.40}Ni_{0.30}O_2$). Powder X-ray diffraction measurement performed on the composite metal oxide 2 showed that the crystal structure of the composite metal oxide 2 belonged to an α-$NaFeO_2$ type crystal structure (FIG. 3). The peak half value width of the (104) plane of this α-$NaFeO_2$ type crystal structure was 0.156 at 2θ. pH measurement performed on the composite metal oxide 2 yielded a value of 12.4.

Example 3

An agate mortar was charged with 153.2 mg of boric acid ($H_3BO_3$), sodium carbonate ($Na_2CO_3$), manganese(IV) oxide ($MnO_2$), iron(III) oxide ($Fe_2O_3$), and nickel(II) oxide (NiO) were used as metal-containing compounds, 15 g of the compounds in total was weighed such that the molar ratio of Na:Mn:Fe:Ni was set to 0.99:0.31:0.41:0.28, and the agate mortar was charged with the compounds and dry-mixed to obtain a mixture.

Figure 4:
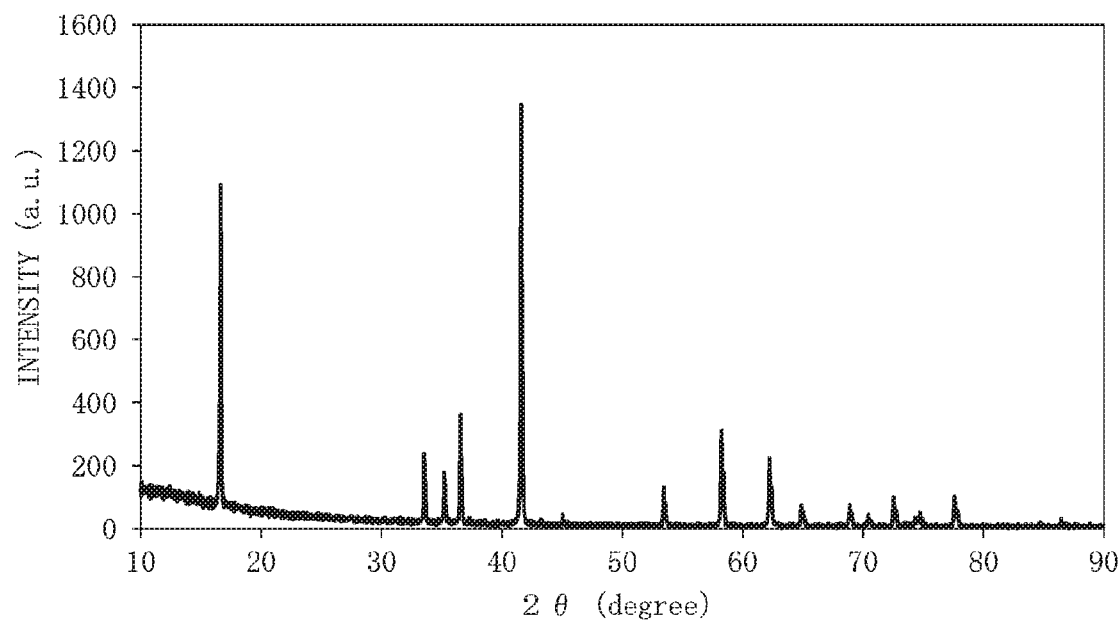
FIG. 4 is an XRD chart for a composite metal oxide of Example 3.

An alumina crucible was filled with the obtained mixture and heated in the air atmosphere using an electric furnace, the state was held at 650° C. for 4 hours in the first calcination step and then held at 900° C. for 12 hours in the second calcination step, and the mixture was calcined and cooled to room temperature, thereby obtaining a composite metal oxide 3 ($Na_{0.99}Mn_{0.31}Fe_{0.41}Ni_{0.28}O_2$). Powder X-ray diffraction measurement performed on the composite metal oxide 3 showed that the crystal structure of the composite metal oxide 3 belonged to an α-$NaFeO_2$ type crystal structure (FIG. 4). The peak half value width of the (104) plane of this α-$NaFeO_2$ type crystal structure was 0.168 at 2θ. pH measurement performed on the composite metal oxide 3 yielded a value of 12.1.

Example 4

An agate mortar was charged with 153.3 mg of boric acid ($H_3BO_3$), sodium carbonate ($Na_2CO_3$), calcium hydroxide ($Ca(OH)_2$), manganese(IV) oxide ($MnO_2$), iron(III) oxide ($Fe_2O_3$), and nickel(II) oxide (NiO) were used as metal-containing compounds, 15 g of the compounds in total was weighed such that the molar ratio of Na:Ca:Mn:Fe:Ni was set to 0.99:0.02:0.31:0.41:0.28, and the agate mortar was charged with the compounds and dry-mixed to obtain a mixture.

Figure 5:
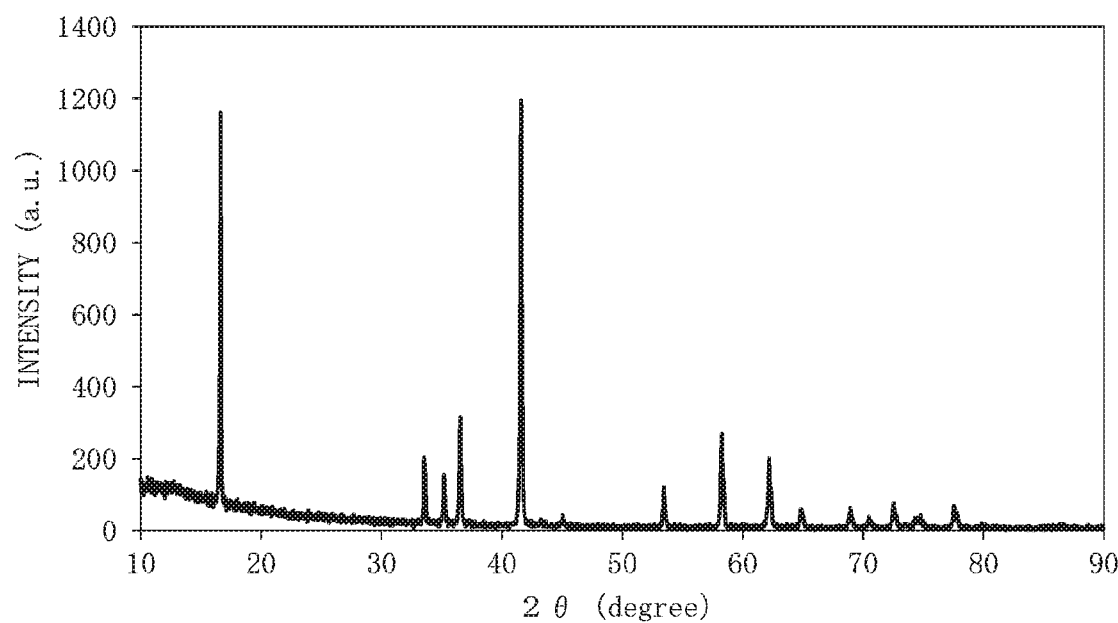
FIG. 5 is an XRD chart for a composite metal oxide of Example 4.

An alumina crucible was filled with the obtained mixture and heated in the air atmosphere using an electric furnace, the state was held at 650° C. for 4 hours in the first calcination step and then held at 900° C. for 12 hours in the second calcination step, and the mixture was calcined and cooled to room temperature, thereby obtaining a composite metal oxide 4 ($Na_{0.99}Ca_{0.02}Mn_{0.31}Fe_{0.41}Ni_{0.28}O_2$). Powder X-ray diffraction measurement performed on the composite metal oxide 4 showed that the crystal structure of the composite metal oxide 4 belonged to an α-$NaFeO_2$ type crystal structure (FIG. 5). The peak half value width of the (104) plane of this α-$NaFeO_2$ type crystal structure was 0.175 at 2θ. pH measurement performed on the composite metal oxide 4 yielded a value of 12.1.

Example 5

An agate mortar was charged with 153.5 mg of boric acid ($H_3BO_3$), sodium carbonate ($Na_2CO_3$), manganese(IV) oxide ($MnO_2$), iron(III) oxide ($Fe_2O_3$), and nickel(II) oxide (NiO) were used as metal-containing compounds, 15 g of the compounds in total was weighed such that the molar ratio of Na:Mn:Fe:Ni was set to 0.99:0.25:0.50:0.25, and the agate mortar was charged with the compounds and dry-mixed to obtain a mixture.

Figure 6:
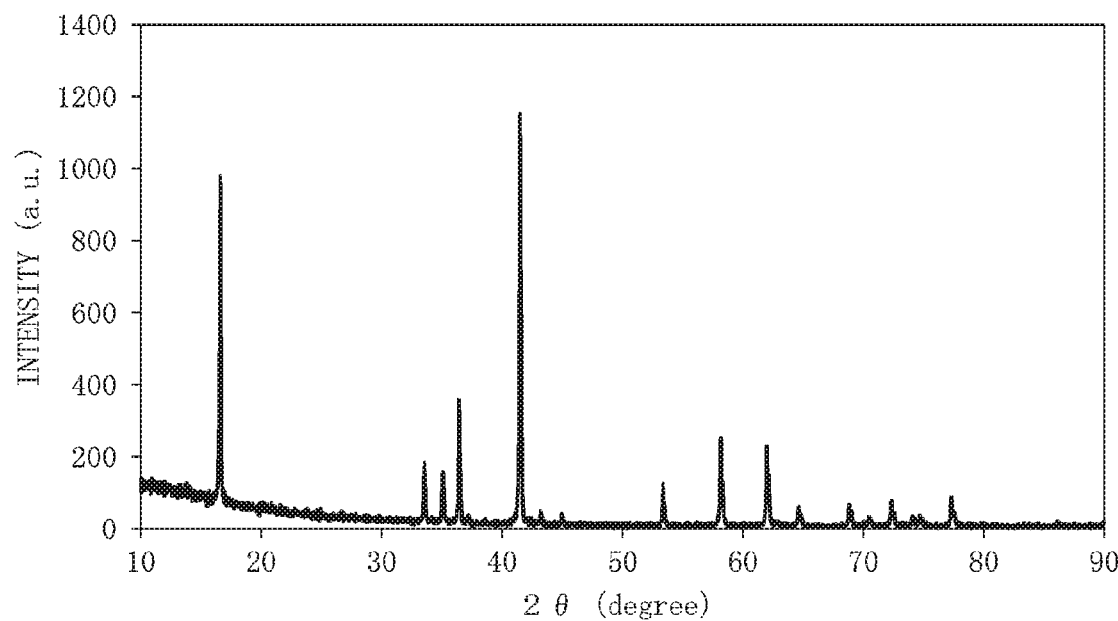
FIG. 6 is an XRD chart for a composite metal oxide of Example 5.

An alumina crucible was filled with the obtained mixture and heated in the air atmosphere using an electric furnace, the state was held at 650° C. for 4 hours in the first calcination step and then held at 900° C. for 12 hours in the second calcination step, and the mixture was calcined and cooled to room temperature, thereby obtaining a composite metal oxide 5 ($Na_{0.99}Mn_{0.25}Fe_{0.5}Ni_{0.25}O_2$). Powder X-ray diffraction measurement performed on the composite metal oxide 5 showed that the crystal structure of the composite metal oxide 5 belonged to an α-$NaFeO_2$ type crystal structure (FIG. 6). The peak half value width of the (104) plane of this α-$NaFeO_2$ type crystal structure was 0.167 at 2θ. pH measurement performed on the composite metal oxide 5 yielded a value of 12.5.

Comparative Example 1

Sodium carbonate ($Na_2CO_3$), manganese(IV) oxide ($MnO_2$), iron(III) oxide ($Fe_2O_3$), and nickel(II) oxide (NiO) were used as metal-containing compounds, 15 g of the compounds in total was weighed such that the molar ratio of Na:Mn:Fe:Ni was set to 0.99:0.31:0.41:0.28, and the agate mortar was charged with the compounds and dry-mixed to obtain a mixture.

Figure 7:
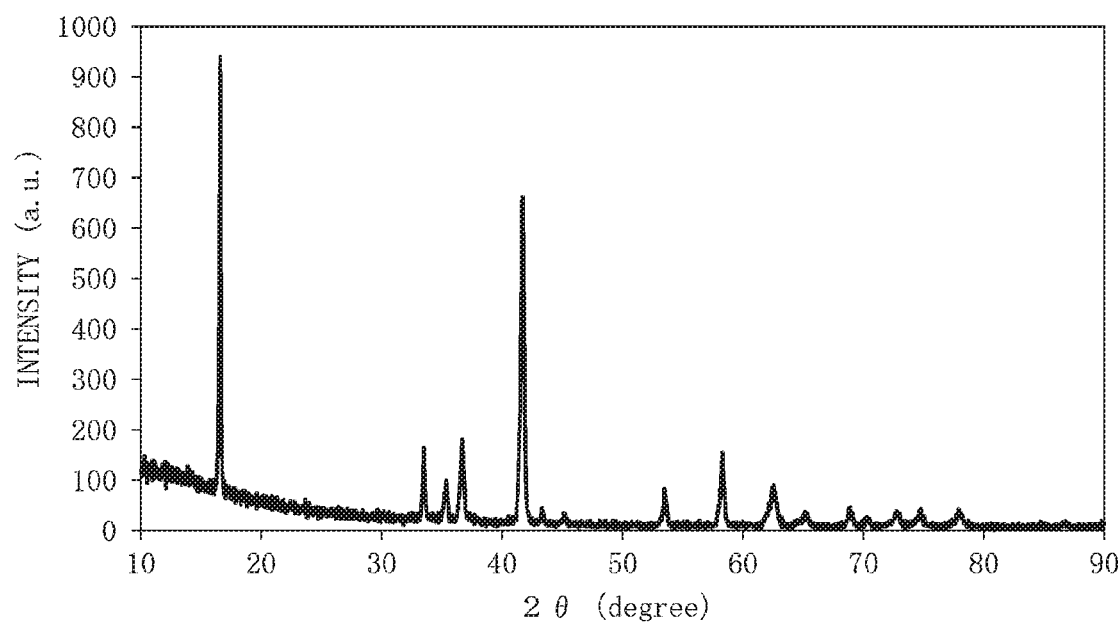
FIG. 7 is an XRD chart for a composite metal oxide of Comparative Example 1.

An alumina crucible was filled with the obtained mixture and heated in the air atmosphere using an electric furnace, the state was held at 900° C. for 12 hours, and the mixture was calcined and cooled to room temperature, thereby obtaining a composite metal oxide 6 ($Na_{0.99}Mn_{0.31}Fe_{0.41}Ni_{0.28}O_2$). Powder X-ray diffraction measurement performed on the composite metal oxide 6 showed that the crystal structure of the composite metal oxide 6 belonged to an α-$NaFeO_2$ type crystal structure (FIG. 7). The peak half value width of the (104) plane of this α-$NaFeO_2$ type crystal structure was 0.303 at 2θ. pH measurement performed on the composite metal oxide 6 yielded a value of 13.0.

Comparative Example 2

Sodium carbonate ($Na_2CO_3$), calcium hydroxide ($Ca(OH)_2$), manganese(IV) oxide ($MnO_2$), iron(III) oxide ($Fe_2O_3$), and nickel(II) oxide (NiO) were used as metal-containing compounds, 15 g of the compounds in total was weighed such that the molar ratio of Na:Ca:Mn:Fe:Ni was set to 0.99:0.02:0.31:0.41:0.28, and the agate mortar was charged with the compounds and dry-mixed to obtain a mixture.

Figure 8:
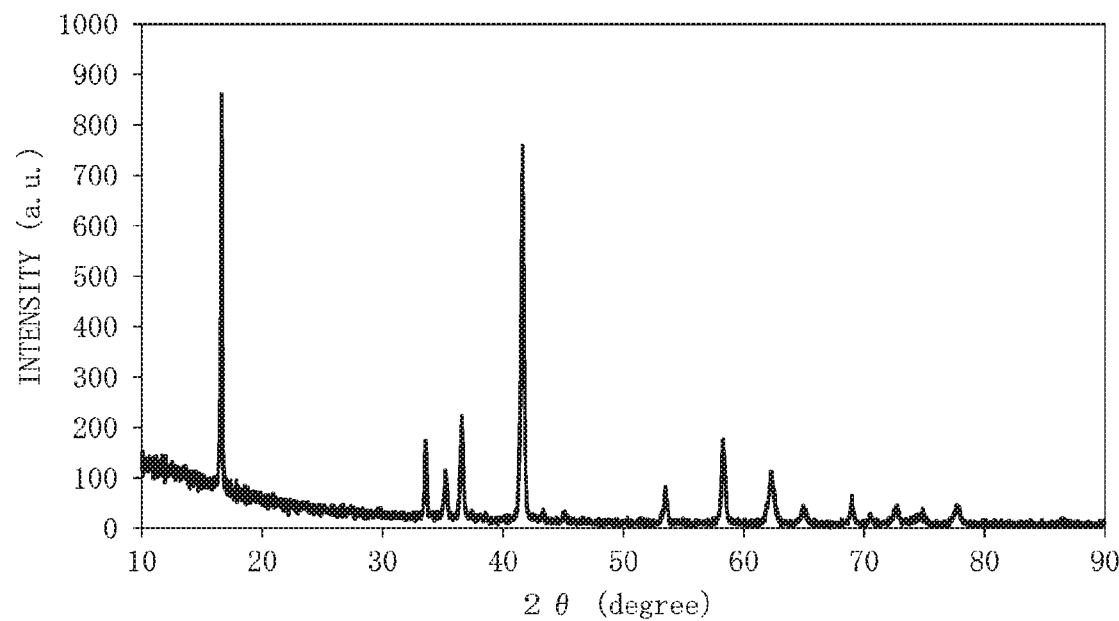
FIG. 8 is an XRD chart for a composite metal oxide of Comparative Example 2.

An alumina crucible was filled with the obtained mixture and heated in the air atmosphere using an electric furnace, the state was held at 900° C. for 12 hours, and the mixture was calcined and cooled to room temperature, thereby obtaining a composite metal oxide 7 ($Na_{0.99}Ca_{0.02}Mn_{0.31}Fe_{0.41}Ni_{0.28}O_2$). Powder X-ray diffraction measurement performed on the composite metal oxide 7 showed that the crystal structure of the composite metal oxide 7 belonged to an α-NaFeO$_2$ type crystal structure (FIG. 8). The peak half value width of the (104) plane of this α-NaFeO$_2$ type crystal structure was 0.271 at 2θ. pH measurement performed on the composite metal oxide 7 yielded a value of 12.9.

Example 6

An agate mortar was charged with 153.6 mg of boric acid (H$_3$BO$_3$), sodium carbonate (Na$_2$CO$_3$), manganese(IV) oxide (MnO$_2$), iron(III) oxide (Fe$_2$O$_3$), and nickel(II) oxide (NiO) were used as metal-containing compounds, 15 g of the compounds in total was weighed such that the molar ratio of Na:Mn:Fe:Ni was set to 0.98:0.31:0.41:0.28, and the agate mortar was charged with the compounds and dry-mixed to obtain a mixture.

Figure 9:
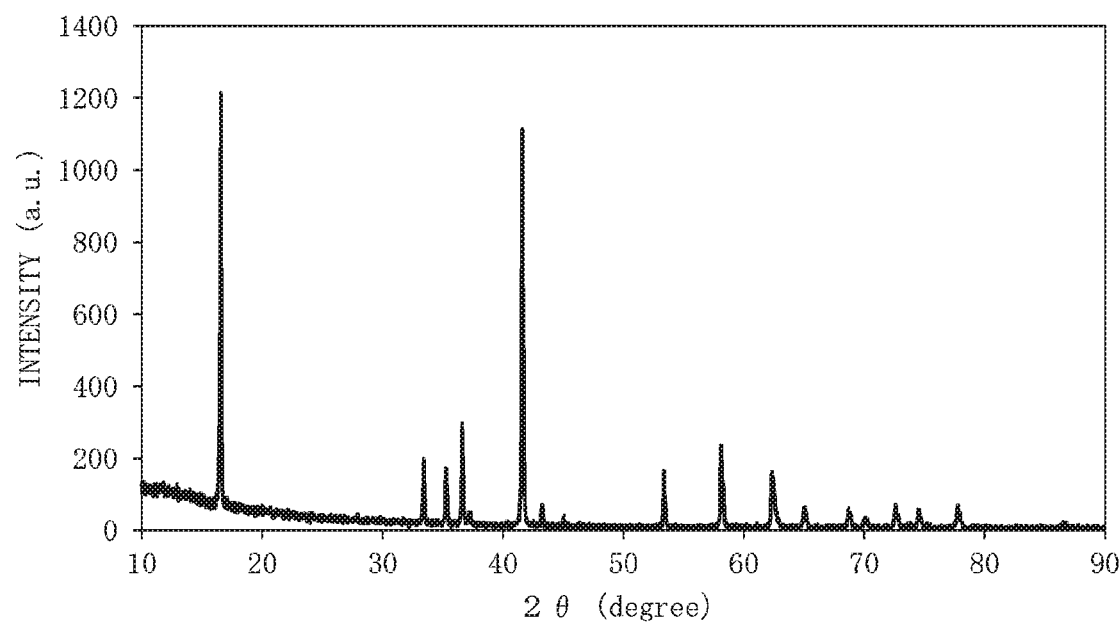
FIG. 9 is an XRD chart for a composite metal oxide of Example 6.

An alumina crucible was filled with the obtained mixture and heated in the air atmosphere using an electric furnace, the state was held at 650° C. for 4 hours in the first calcination step and then held at 900° C. for 12 hours in the second calcination step, and the mixture was calcined and cooled to room temperature, thereby obtaining a composite metal oxide 8 (Na$_{0.98}$Mn$_{0.31}$Fe$_{0.41}$Ni$_{0.28}$O$_2$). Powder X-ray diffraction measurement performed on the composite metal oxide 8 showed that the crystal structure of the composite metal oxide 8 belonged to an α-NaFeO$_2$ type crystal structure (FIG. 9). The peak half value width of the (104) plane of this α-NaFeO$_2$ type crystal structure was 0.157 at 2θ. pH measurement performed on the composite metal oxide 8 yielded a value of 11.7.

Example 7

An agate mortar was charged with 76.8 mg of boric acid (H$_3$BO$_3$), sodium carbonate (Na$_2$CO$_3$), calcium hydroxide (Ca(OH)$_2$), manganese(IV) oxide (MnO$_2$), iron(III) oxide (Fe$_2$O$_3$), and nickel(II) oxide (NiO) were used as metal-containing compounds, 15 g of the compounds in total was weighed such that the molar ratio of Na:Ca:Mn:Fe:Ni was set to 0.99:0.02:0.31:0.41:0.28, and the agate mortar was charged with the compounds and dry-mixed to obtain a mixture.

Figure 10:
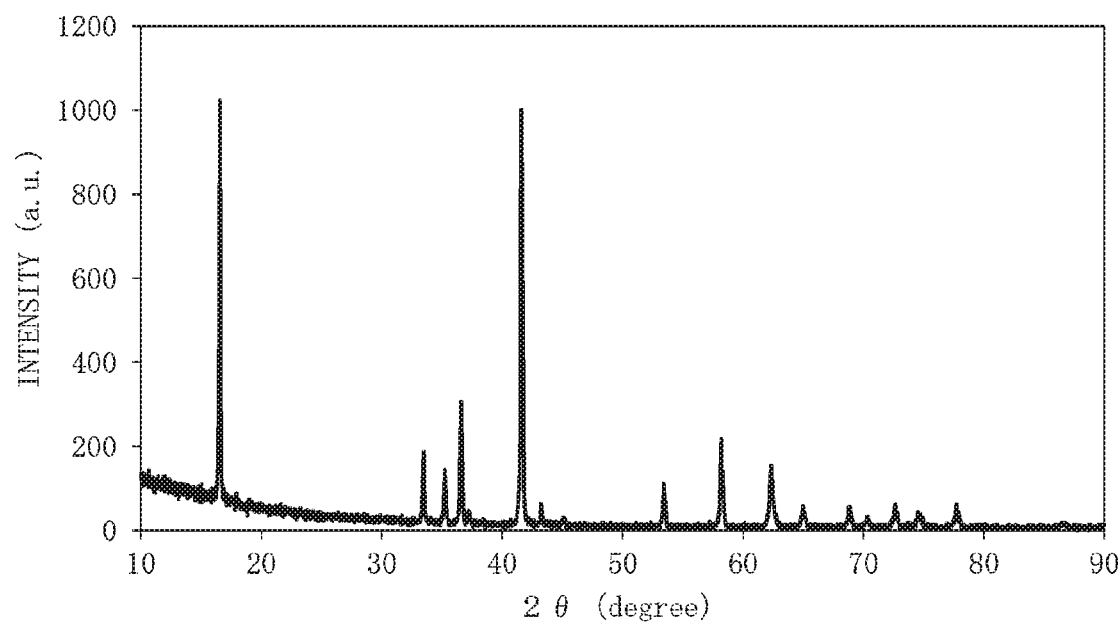
FIG. 10 is an XRD chart for a composite metal oxide of Example 7.

An alumina crucible was filled with the obtained mixture and heated in the air atmosphere using an electric furnace, the state was held at 650° C. for 4 hours in the first calcination step and then held at 900° C. for 12 hours in the second calcination step, and the mixture was calcined and cooled to room temperature, thereby obtaining a composite metal oxide 9 (Na$_{0.99}$Ca$_{0.02}$Mn$_{0.31}$Fe$_{0.41}$Ni$_{0.28}$O$_2$). Powder X-ray diffraction measurement performed on the composite metal oxide 9 showed that the crystal structure of the composite metal oxide 9 belonged to an α-NaFeO$_2$ type crystal structure (FIG. 10). The peak half value width of the (104) plane of this α-NaFeO$_2$ type crystal structure was 0.184 at 2θ. pH measurement performed on the composite metal oxide 9 yielded a value of 12.2.

Example 8

An agate mortar was charged with 153.7 mg of boric acid (H$_3$BO$_3$), sodium carbonate (Na$_2$CO$_3$), calcium hydroxide (Ca(OH)$_2$), manganese(IV) oxide (MnO$_2$), iron(III) oxide (Fe$_2$O$_3$), and nickel(II) oxide (NiO) were used as metal-containing compounds, 15 g of the compounds in total was weighed such that the molar ratio of Na:Ca:Mn:Fe:Ni was set to 1.00:0.02:0.31:0.41:0.28, and the agate mortar was charged with the compounds and dry-mixed to obtain a mixture.

Figure 11:
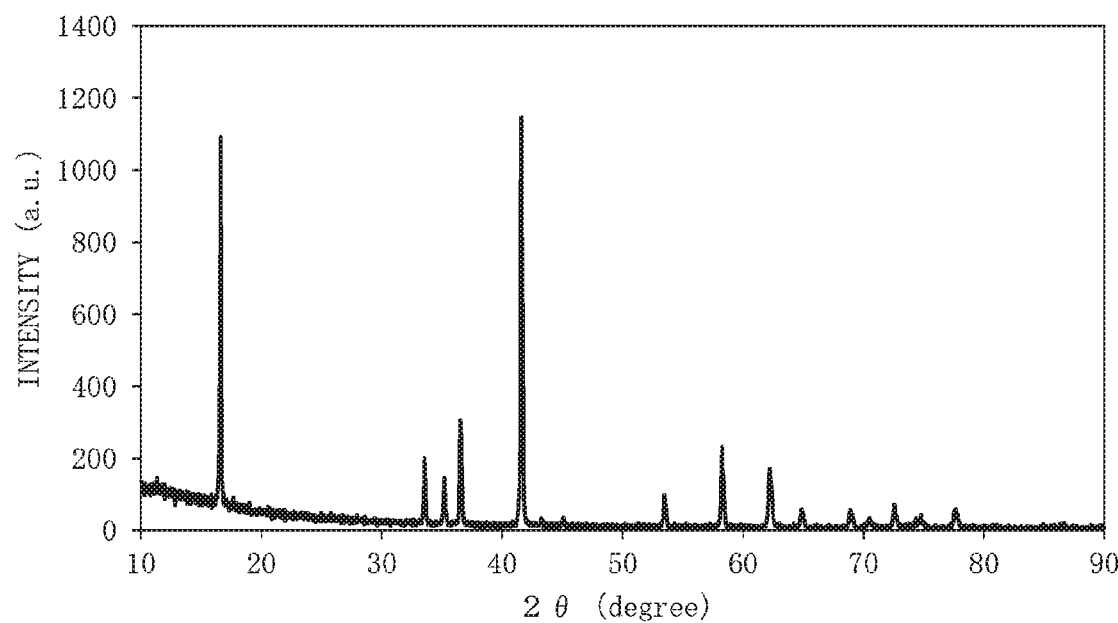
FIG. 11 is an XRD chart for a composite metal oxide of Example 8.

An alumina crucible was filled with the obtained mixture and heated in the air atmosphere using an electric furnace, the state was held at 650° C. for 4 hours in the first calcination step and then held at 900° C. for 12 hours in the second calcination step, and the mixture was calcined and cooled to room temperature, thereby obtaining a composite metal oxide 10 (Na$_{1.00}$Ca$_{0.02}$Mn$_{0.31}$Fe$_{0.41}$Ni$_{0.28}$O$_2$). Powder X-ray diffraction measurement performed on the composite metal oxide 10 showed that the crystal structure of the composite metal oxide 10 belonged to an α-NaFeO$_2$ type crystal structure (FIG. 11). The peak half value width of the (104) plane of this α-NaFeO$_2$ type crystal structure was 0.164 at 2θ. pH measurement performed on the composite metal oxide 10 yielded a value of 12.2.

Example 9

An agate mortar was charged with 153.6 mg of boric acid (H$_3$BO$_3$), sodium carbonate (Na$_2$CO$_3$), calcium hydroxide (Ca(OH)$_2$), manganese(IV) oxide (MnO$_2$), iron(III) oxide (Fe$_2$O$_3$), and nickel(II) oxide (NiO) were used as metal-containing compounds, 15 g of the compounds in total was weighed such that the molar ratio of Na:Ca:Mn:Fe:Ni was set to 0.98:0.02:0.265:0.47:0.265, and the agate mortar was charged with the compounds and dry-mixed to obtain a mixture.

Figure 12:
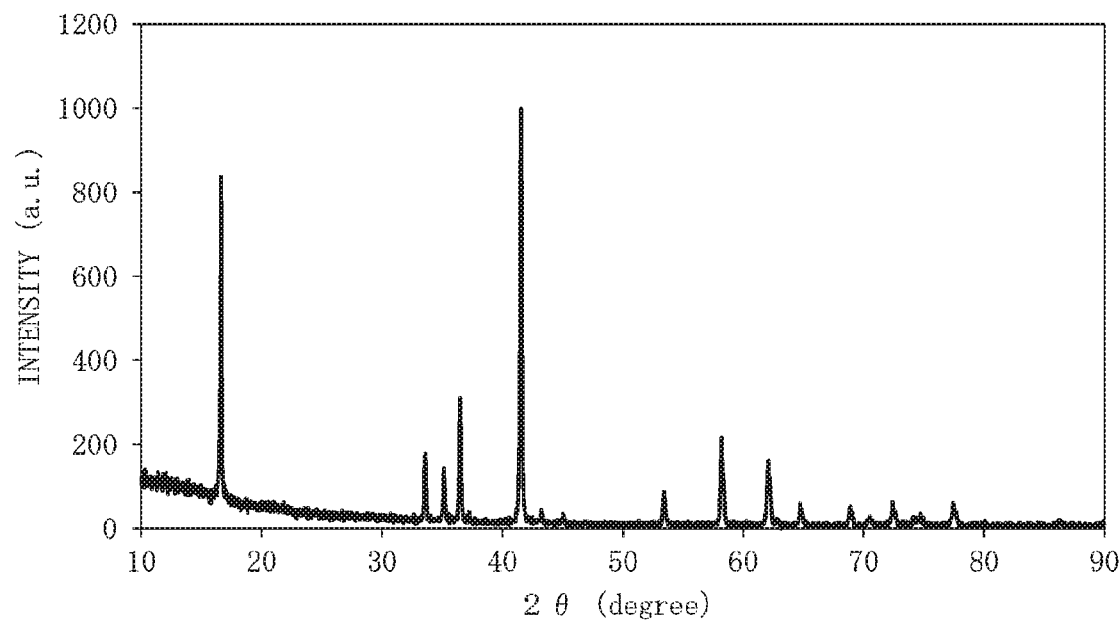
FIG. 12 is an XRD chart for a composite metal oxide of Example 9.

An alumina crucible was filled with the obtained mixture and heated in the air atmosphere using an electric furnace, the state was held at 650° C. for 4 hours in the first calcination step and then held at 900° C. for 12 hours in the second calcination step, and the mixture was calcined and cooled to room temperature, thereby obtaining a composite metal oxide 11 (Na$_{0.98}$Ca$_{0.02}$Mn$_{0.265}$Fe$_{0.47}$Ni$_{0.265}$O$_2$). Powder X-ray diffraction measurement performed on the composite metal oxide 11 showed that the crystal structure of the composite metal oxide 11 belonged to an α-NaFeO$_2$ type crystal structure (FIG. 12). The peak half value width of the (104) plane of this α-NaFeO$_2$ type crystal structure was 0.179 at 2θ. pH measurement performed on the composite metal oxide 11 yielded a value of 12.4.

Example 10

An agate mortar was charged with 154.1 mg of boric acid (H$_3$BO$_3$), sodium carbonate (Na$_2$CO$_3$), magnesium oxide (MgO), manganese(IV) oxide (MnO$_2$), iron(III) oxide (Fe$_2$O$_3$), nickel(II) oxide (NiO), and titanium (IV)oxide (anatase, TiO$_2$) were used as metal-containing compounds, 15 g of the compounds in total was weighed such that the molar ratio of Na:Mg:Mn:Fe:Ni:Ti was set to 0.99:0.02:0.26:0.41:0.28:0.05, and the agate mortar was charged with the compounds and dry-mixed to obtain a mixture.

Figure 13:
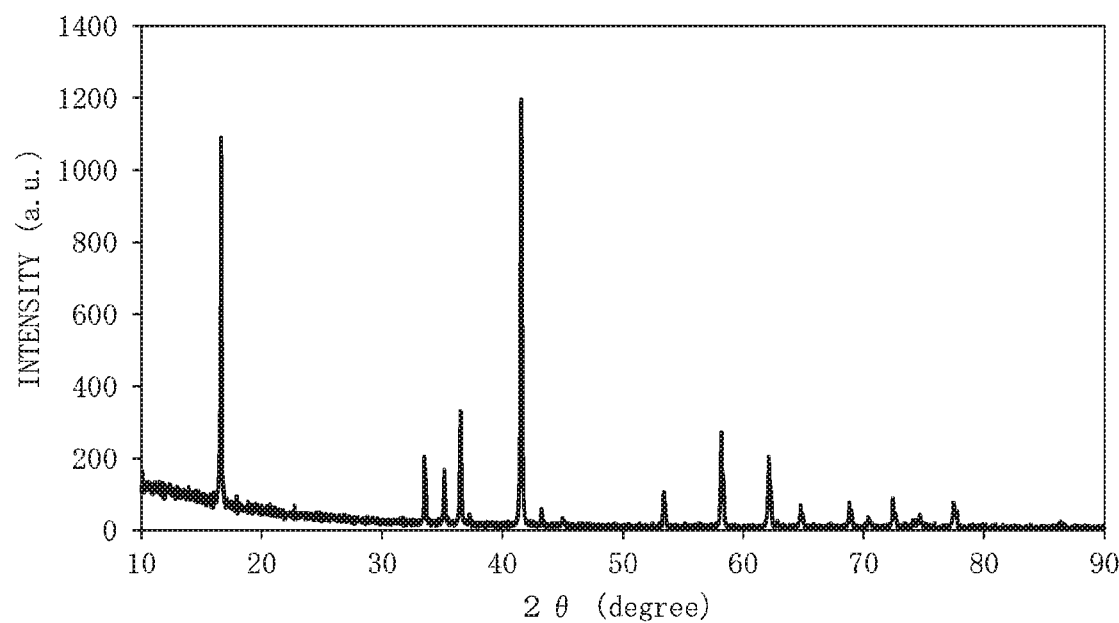
FIG. 13 is an XRD chart for a composite metal oxide of Example 10.

An alumina crucible was filled with the obtained mixture and heated in the air atmosphere using an electric furnace, the state was held at 650° C. for 4 hours in the first calcination step and then held at 900° C. for 12 hours in the second calcination step, and the mixture was calcined and cooled to room temperature, thereby obtaining a composite metal oxide 12 (Na$_{0.99}$Mg$_{0.02}$Mn$_{0.26}$Fe$_{0.41}$Ni$_{0.28}$Ti$_{0.05}$O$_2$). Powder X-ray diffraction measurement performed on the composite metal oxide 12 showed that the crystal structure of the composite metal oxide 12 belonged to an α-NaFeO$_2$ type crystal structure (FIG. 13). The peak half value width of the (104) plane of this α-NaFeO$_2$ type crystal structure was 0.161 at 2θ. pH measurement performed on the composite metal oxide 12 yielded a value of 12.2.

The results of Examples 1 to 10 and Comparative Examples 1 and 2 are collectively listed in Table 1.

TABLE 1

| | Composite metal oxide composition | Additive during production | calcination condition First calcination step | calcination condition Second calcination step | Half value width of (104) at 2θ by XRD | pH | Coatability |
|---|---|---|---|---|---|---|---|
| Example 1 | $Na_{0.99}Mn_{0.35}Fe_{0.30}Ni_{0.35}O_2$ | 1% by weight of $H_3BO_3$ | At 650° C. for 4 hours | At 900° C. for 12 hours | 0.160 | 12.5 | ○ |
| Example 2 | $Na_{0.99}Mn_{0.30}Fe_{0.40}Ni_{0.30}O_2$ | 1% by weight of $H_3BO_3$ | At 650° C. for 4 hours | At 900° C. for 12 hours | 0.156 | 12.4 | ○ |
| Example 3 | $Na_{0.99}Mn_{0.31}Fe_{0.41}Ni_{0.28}O_2$ | 1% by weight of $H_3BO_3$ | At 650° C. for 4 hours | At 900° C. for 12 hours | 0.168 | 12.1 | ○ |
| Example 4 | $Na_{0.99}Ca_{0.02}Mn_{0.31}Fe_{0.41}Ni_{0.28}O_2$ | 1% by weight of $H_3BO_3$ | At 650° C. for 4 hours | At 900° C. for 12 hours | 0.175 | 12.1 | ○ |
| Example 5 | $Na_{0.99}Mn_{0.25}Fe_{0.50}Ni_{0.25}O_2$ | 1% by weight of $H_3BO_3$ | At 650° C. for 4 hours | At 900° C. for 12 hours | 0.167 | 12.5 | ○ |
| Example 6 | $Na_{0.98}Mn_{0.31}Fe_{0.41}Ni_{0.28}O_2$ | 1% by weight of $H_3BO_3$ | At 650° C. for 4 hours | At 900° C. for 12 hours | 0.157 | 11.7 | ○ |
| Example 7 | $Na_{0.99}Ca_{0.02}Mn_{0.31}Fe_{0.41}Ni_{0.28}O_2$ | 0.5% by weight of $H_3BO_3$ | At 650° C. for 4 hours | At 900° C. for 12 hours | 0.184 | 12.2 | ○ |
| Example 8 | $Na_{1.00}Ca_{0.02}Mn_{0.31}Fe_{0.41}Ni_{0.28}O_2$ | 1% by weight of $H_3BO_3$ | At 650° C. for 4 hours | At 900° C. for 12 hours | 0.164 | 12.2 | ○ |
| Example 9 | $Na_{0.98}Ca_{0.02}Mn_{0.265}Fe_{0.47}Ni_{0.265}O_2$ | 1% by weight of $H_3BO_3$ | At 650° C. for 4 hours | At 900° C. for 12 hours | 0.179 | 12.4 | ○ |
| Example 10 | $Na_{0.99}Mg_{0.02}Mn_{0.26}Fe_{0.41}Ni_{0.28}Ti_{0.05}O_2$ | 1% by weight of $H_3BO_3$ | At 650° C. for 4 hours | At 900° C. for 12 hours | 0.161 | 12.2 | ○ |
| Comparative Example 1 | $Na_{0.99}Mn_{0.31}Fe_{0.41}Ni_{0.28}O_2$ | None | At 900° C. for 12 hours | None | 0.303 | 13.0 | x |
| Comparative Example 2 | $Na_{0.99}Ca_{0.02}Mn_{0.31}Fe_{0.41}N_{10.28}O_2$ | None | At 900° C. for 12 hours | None | 0.271 | 12.9 | x |

As shown in the results, the coatabilities of Examples 1 to 10 were all evaluated as "○." On the other hand, the coatabilities of Comparative Examples 1 and 2 were evaluated as "x." It was speculated that since the results of pH in Comparative Examples 1 and 2 were high, sodium hydroxide was formed from the reaction with the moisture in air due to low water resistance.

REFERENCE SIGNS LIST

1: separator
2: positive electrode
3: negative electrode
4: electrode group
5: battery can
6: electrolytic solution
7: top insulator
8: sealing member
10: sodium secondary battery
21: lead
31: lead

The invention claimed is:

1. A composite metal oxide which is represented by Formula (1) and has an α-NaFeO$_2$ type crystal structure, wherein a peak half value width of a (104) plane to be measured by powder X-ray diffraction is 0.250° or less at 2θ, wherein

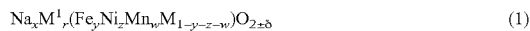

$$Na_xM^1_r(Fe_yNi_zMn_wM_{1-y-z-w})O_{2\pm\delta} \quad (1)$$

in Formula (1), M represents any one or more elements selected from the group consisting of B, Si, V, Co, Mo, Pd, Re, Pb, and Bi, M$^1$ represents any one or more elements selected from the group consisting of Mg and Ca, and relationships 0≤r≤0.1, 0.5≤x≤1.0, 0.1 ≤y≤0.5, 0<z<0.4, 0<w<0.4, 0≤δ≤0.05, and y+z+w≤1 are satisfied.

2. The composite metal oxide according to claim 1, wherein the peak half value width of the (104) plane to be measured by powder X-ray diffraction is less than 0.200° at 2θ.

3. The composite metal oxide according to claim 1, wherein y is greater than or equal to 0.2 and less than or equal to 0.5, z is greater than 0.15 and less than 0.4, and w is greater than 0.15 and less than 0.4.

4. A positive electrode active material comprising:
the composite metal oxide according to claim 1.

5. A positive electrode comprising:
the positive electrode active material according to claim 4.

6. A sodium secondary battery comprising:
the positive electrode according to claim 5.

7. A method for producing a composite metal oxide which has an α-NaFeO$_2$ type crystal structure and in which a peak half value width of a (104) plane to be measured by powder X-ray diffraction is 0.250° or less at 2θ, the method comprising:
a mixing step of mixing a Na-containing compound, an Fe-containing compound, a Ni-containing compound, a Mn-containing compound, and an M-containing compound having a melting point of 800° C. or lower to obtain a mixture; and
a calcination step of calcining a powder which contains the mixture,
wherein M represents one or more elements selected from the group consisting of B, Si, V, Co, Mo, Pd, Re, Pb, and Bi,
wherein the calcination step includes a first calcination step and a second calcination step, and
the second calcination step is performed at a temperature higher than a temperature of the first calcination step.

8. The method for producing a composite metal oxide according to claim 7,
wherein the first calcination step is performed at a holding temperature higher than or equal to 500° C. and lower than or equal to 900° C., the second calcination step is performed at a holding temperature higher than or equal to 750° C. and lower than or equal to 1000° C., and the second calcination step is performed at a holding temperature higher than the holding temperature of the first calcination step.

9. The method for producing a composite metal oxide according to claim 7, wherein the M-containing compound contains a compound having a melting point lower than or equal to the holding temperature of the first calcination step.

10. The method for producing a composite metal oxide according to claim 7, wherein the M-containing compound contains B.

* * * * *